(12) United States Patent
Torres et al.

(10) Patent No.: US 7,797,318 B2
(45) Date of Patent: Sep. 14, 2010

(54) NETWORKING THROUGH ELECTRONIC MESSAGING AND MAIL

(75) Inventors: Michael I. Torres, Seattle, WA (US); John R. Kountz, Issaquah, WA (US); Oludare Obasanjo, Seattle, WA (US); Matthew S. Augustine, Seattle, WA (US); Jason C. Fluegel, Seattle, WA (US); Jacob D. Kim, Redmond, WA (US); DeEtte M. Day, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 196 days.

(21) Appl. No.: 11/212,826

(22) Filed: Aug. 25, 2005

(65) Prior Publication Data

US 2007/0067392 A1    Mar. 22, 2007

(51) Int. Cl.
*G06F 17/30*    (2006.01)
(52) U.S. Cl. .................................. 707/736; 709/206
(58) Field of Classification Search .................. None
See application file for complete search history.

(56) References Cited

U.S. PATENT DOCUMENTS

| | | | |
|---|---|---|---|
| 6,684,248 B1* | 1/2004 | Janacek et al. | 709/225 |
| 7,069,308 B2* | 6/2006 | Abrams | 709/218 |
| 7,334,021 B1* | 2/2008 | Fletcher, George | 709/206 |
| 7,685,236 B1* | 3/2010 | Harik et al. | 709/205 |
| 2002/0023132 A1* | 2/2002 | Tornabene et al. | 709/205 |
| 2003/0028595 A1* | 2/2003 | Vogt et al. | 709/204 |
| 2003/0037112 A1* | 2/2003 | Fitzpatrick et al. | 709/205 |
| 2005/0114366 A1* | 5/2005 | Mathai et al. | 707/100 |
| 2005/0216300 A1* | 9/2005 | Appelman et al. | 705/1 |
| 2005/0243978 A1* | 11/2005 | Son et al. | 379/88.13 |

FOREIGN PATENT DOCUMENTS

| | | |
|---|---|---|
| JP | 2002259730 | 9/2002 |
| JP | 2003132158 | 5/2003 |
| KR | 1020050015954 | 2/2005 |
| KR | 1020050033995 | 4/2005 |

OTHER PUBLICATIONS

Friendster Beta, The New Way to Meet People, http://web.archive.org/web/20040202184053/www.friendster.com/index.jsp, Feb. 2004, pp. 1-8.*
Friendster, Inc., Member Profile, http://www.friendster.com/user.php?uid= Jul. 2005, pp. 1-2.*
MySpace, A Place for Friends, http://web.archive.org/web/20031020191920/http://myspace.com/, Oct. 2003, pp. 1-7.*
Friendster, Inc., Member Profile, http://www.friendster.com/user.php?uid= Jul. 2005.
MySpace.com, Member Home Page, http://home.myspace.com/index.cfm?fuseaction=user&Mytoken=, Jul. 2005.

* cited by examiner

*Primary Examiner*—James Trujillo
*Assistant Examiner*—Michele C Choi
(74) *Attorney, Agent, or Firm*—Vierra Magen Marcus & DeNiro LLP

(57) ABSTRACT

A social networking service is integrated with a traditional communication service. The communication service may include an instant messaging service, an electronic mail service, a content page management service, or other communication service. The communication service provides one or more interfaces allowing a user to navigate and manage a contact network. A user may access several layers of contacts, and expand their contact list, by selecting additional contacts within additional contact lists.

11 Claims, 18 Drawing Sheets

NETWORKING THROUGH ELECTRONIC MESSAGING AND MAIL

BACKGROUND

Web based social networking has become a popular way for people to meet other people over the Internet. Typically, social networking is implemented by websites that provide a dedicated social networking service. Social networking services are typically stand alone web-based services.

To use a web-based social networking service, a user may provide information to setup an account with a social networking service. Once a user's account is configured, users can generate "profiles" of themselves. The profiles typically contain basic information about a user (such as location, occupation, hobbies, etc.).

Social networking services allow users to view other user profiles, join groups with a common subject or theme, add other registered users to a contact list, and send messages to other users having an account with the particular networking service. As stand alone web services, users must generate an account and develop a "network" over time. Messages sent to other users are typically sent as text-based messages, sometimes containing formatting and other markup, and are handled entirely by the social networking system. Communication is typically limited to other users having an account with the networking service. Thus, a user may not send a message to a mail address outside the social networking service other than an invitation to join the social networking service.

SUMMARY

The technology herein, roughly described, provides a communication service integrated with a contact networking service. Thus, a user may access and manage a contact network through the electronic communication service. The electronic communication service may include an electronic instant messaging service, an electronic mail service, or some other communication service. In one embodiment, a user may access and configure a contact network through interfaces provided by the communication service. Thus, a single web based service provides a user with a social networking and communication service.

A user may navigate through several layers of a contact network, wherein each layer is a contact list. At the top layer, the contact network may include the user's own contact list. The second layer may contain a contact list associated with a contact within the user's contact list. Thus, a user may select a contact within his contact list and view that contact's contact list. While viewing the contact list associated with the user's contact, the user may select a contact within that contact list. After selecting the contact, the user may view the contact list associated with the selected contact (comprising the third layer of the contact network). In this manner, a user may continue to view layers of his or her contact network by selecting additional contacts in additional contact lists.

A contact list is a list of contacts associated with a user that has an account with an electronic communication service. For example, in an electronic instant messaging service, a user can have a list of contacts (sometimes called a "buddy list") to which he or she may send an instant message over the Internet. In an electronic mail service, a user typically has a list of contacts maintained in an address book to whom the user may send an electronic message (or email). In one embodiment, the contact list for the contacts network herein may include, or be derived from, any of the contacts associated with a communication service. Thus, a contact list for a user may include instant messaging contacts, address book contacts, or other contacts.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

Figure 1:
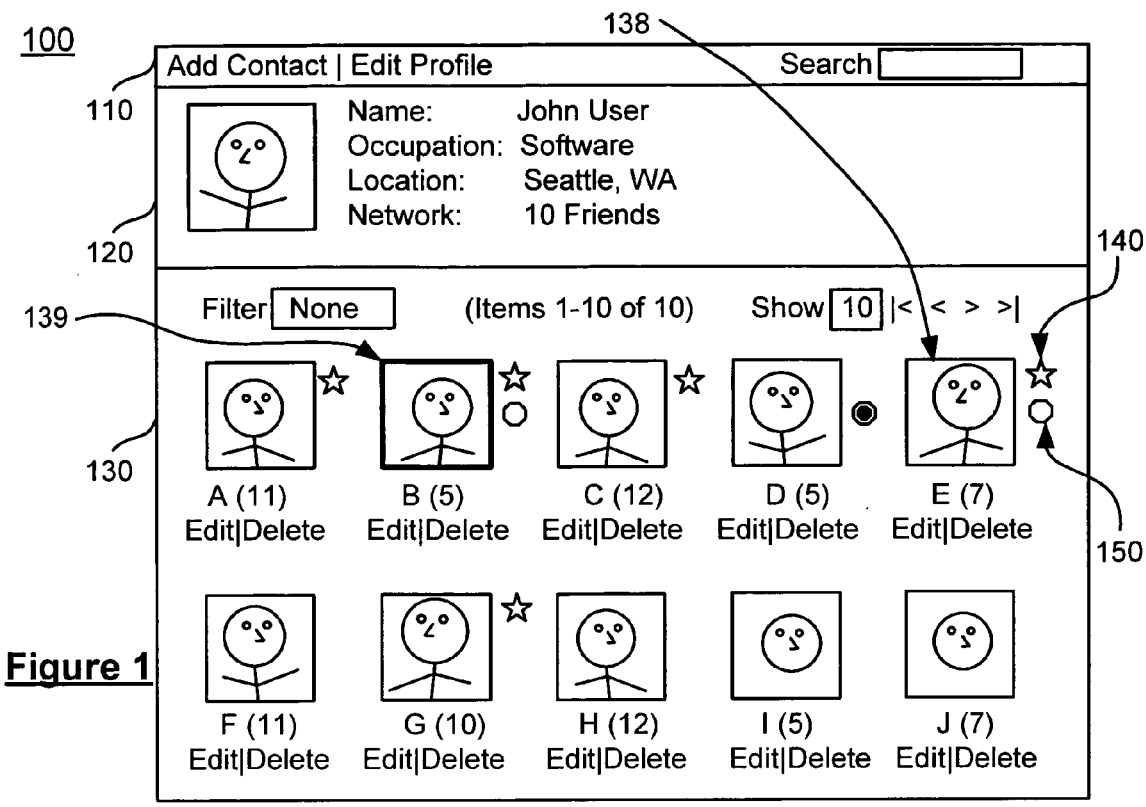
FIG. 1 illustrates an embodiment of a content page which provides a user's contact network.

A social networking service is integrated with a traditional communication service. The communication service may include an instant messaging service, an electronic mail service, a content page management service, or other communication service. The communication service provides one or more interfaces allowing a user to navigate and manage a contact network. A contact network is provided and managed by a communication service with which the user has an account. In one embodiment, a contact network includes a user contact list and contact lists of other selected contacts.

A user may access several layers of contacts by selecting additional contacts within additional contact lists. In some embodiments, permissions are required in order for a user to access information from contacts within someone else's contact list. In this case, all or some of the contacts within a contact list not primarily associated with the user will be limited.

In some embodiments, a contact network may be accessed and managed by a user through an electronic mail service. In one embodiment, an electronic mail service is a service provided over a network, such as the Internet, in which a user having an account with the service may send and receive an electronic message to and from a second user having an account with an electronic mail service. The second user may have an account with the same or a different electronic mail service (i.e., the recipient may have an email account with the same or a different domain than that of the user sending the electronic message).

When accessing a contact network through an electronic mail service, the user's contacts and other contacts may be provided to a user through mail service interfaces. These interfaces may include a mail service inbox interface, contacts interface, address book interface, or some other interface provided by the mail service. The user may access contact lists of other users by providing input into a communication service interface. The user's input may select another contact or the user's contact list. Once selected, a contact network interface is provided. The contact network interface provides the list of contacts as well as profile information for each contact. Access and management of a contact network through an electronic mail service is described in more detail below.

In some embodiments, a contact network may be accessed and managed through an instant messaging service. In one embodiment, an instant messaging service is a service provided over a network, such as the Internet, in which a user having an account with the service may send and receive instant messages to a recipient having an account with the service. Typically, the sender and recipient have an account with the same instant messaging service.

When accessing a contact network through an instant messaging service, the instant messaging service may provide an interface for accessing the user's contact list or another user's contact list. For example, a user may select any contact, or buddy, within the user's contact list for which a user may send instant messages to. When selected, a contact network interface can be provided by the electronic messaging service. The contact network interface provides the contacts associated with the contact selected by the user. Accessing and managing a contact network through an electronic messaging service is described in more detail below.

As discussed above, a user may access his own contact list or a selected contact through a communication service. The contact network interface may be provided in a content page by a browser application or by some other application. FIG. 1 illustrates an embodiment of a content page 100 having a contact network interface for a user. Content page 100 may be provided by a browser application and provides a user's contact list and access to the user's contact network. Content page 100 includes header window 110, profile information window 120, and contact list information window 130. Header window 110 includes buttons allowing a user to perform tasks such as adding a contact, editing the user's profile and searching contacts. These tasks are discussed in more detail below.

Profile information window 120 includes profile information for the user associated with content page 100. As illustrated, profile information window 120 includes a name for the user, the user's occupation, location and network, and a thumbnail image for the user. Other profile information may also be provided.

Content list information window 130 includes profile information for the contact list associated with the user. For each contact within the user's contact list, the provided profile information includes a thumbnail image, the contact's name, the number of contacts within that particular contact's contact list, an online indicator for the contact, and content page indicator, if applicable. An online indicator 140 indicates that the user is currently signed in to the communication service associated with the content page (messaging service, mail service, etc.). As indicated, not all contacts will have an online indicator (see contact D). A content page indicator 150 indicates that a content page associated with that contact has been changed or has new information. The contact thumbnail (such as thumbnail 138) may be any profile image the user has selected to associate with his profile. In some embodiments, the profile image is selected automatically for the user. This may be the case if the user has not completed a profile registration process. For example, contacts I and J within contact list information window 130 have profile images selected by the system rather than the user. In one embodiment, this indicates that a user, or contact, has not completed a registration process with the communication service or uploaded an image.

Figure 2:
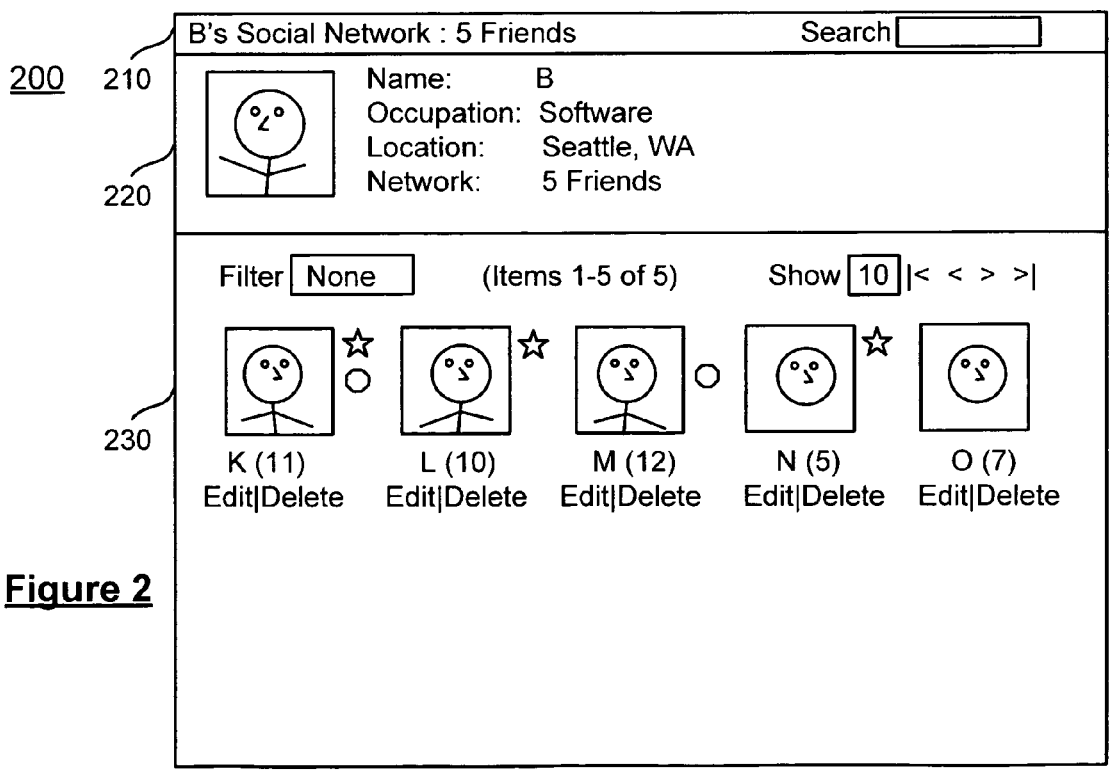
FIG. 2 illustrates an embodiment of a content page which provides a selected contact's contact network.

FIG. 2 illustrates an embodiment of a content page 200 having a contact network interface. Content page 200 provides a selected contact's contact list. In particular, the content page of FIG. 2 provides a contact list for a contact 139 selected by a user through content page 100 of FIG. 1 (in particular, the contact "B"). As illustrated in the content page of FIG. 1, the contact B is highlighted. When selected, a contact network interface is provided which illustrates contact "B" contacts. Content page 200 of FIG. 2 includes header window 210, profile information window 220 and contact list information window 230. Header window 210 indicates that the content page is associated with contact "B", and that B has five contacts (or friends). Profile information window 220 provides profile information for B similar to that provided for the user in content page 100 of FIG. 1. Contact list information window 230 provides information regarding the profiles of the contacts associated with the contact B. The user associated with content page 100 of FIG. 1 has access to B's contacts through content page 200 of FIG. 2. This is discussed in more detail below.

In one embodiment, a user can continue to view additional contact lists by selecting a contact from the contact network interface provided in content page 200 of FIG. 2, and then another contact from the contact list provided in response to that selection. The user can add contacts from any of the resulting contact lists to the user's contact list. In this manner, the user may expand his contact list while accessing several layers of contact lists.

In one embodiment, though a user may provide input to add a contact to his contact list, the user may not be added to the contact list of the selected contact. When a user has a contact in his contact list that does not have the user in the contact's contact list, the relationship between the user and the contact is a one way relationship. If the selected contact does add the user to the contact's contact list, then the relationship is a two-way relationship. Users in a two-way relationship may be provided more information, such as a photo and contact information, when viewing each other's contact list than those in a one way relationship. This is discussed in more detail below.

Figure 3:
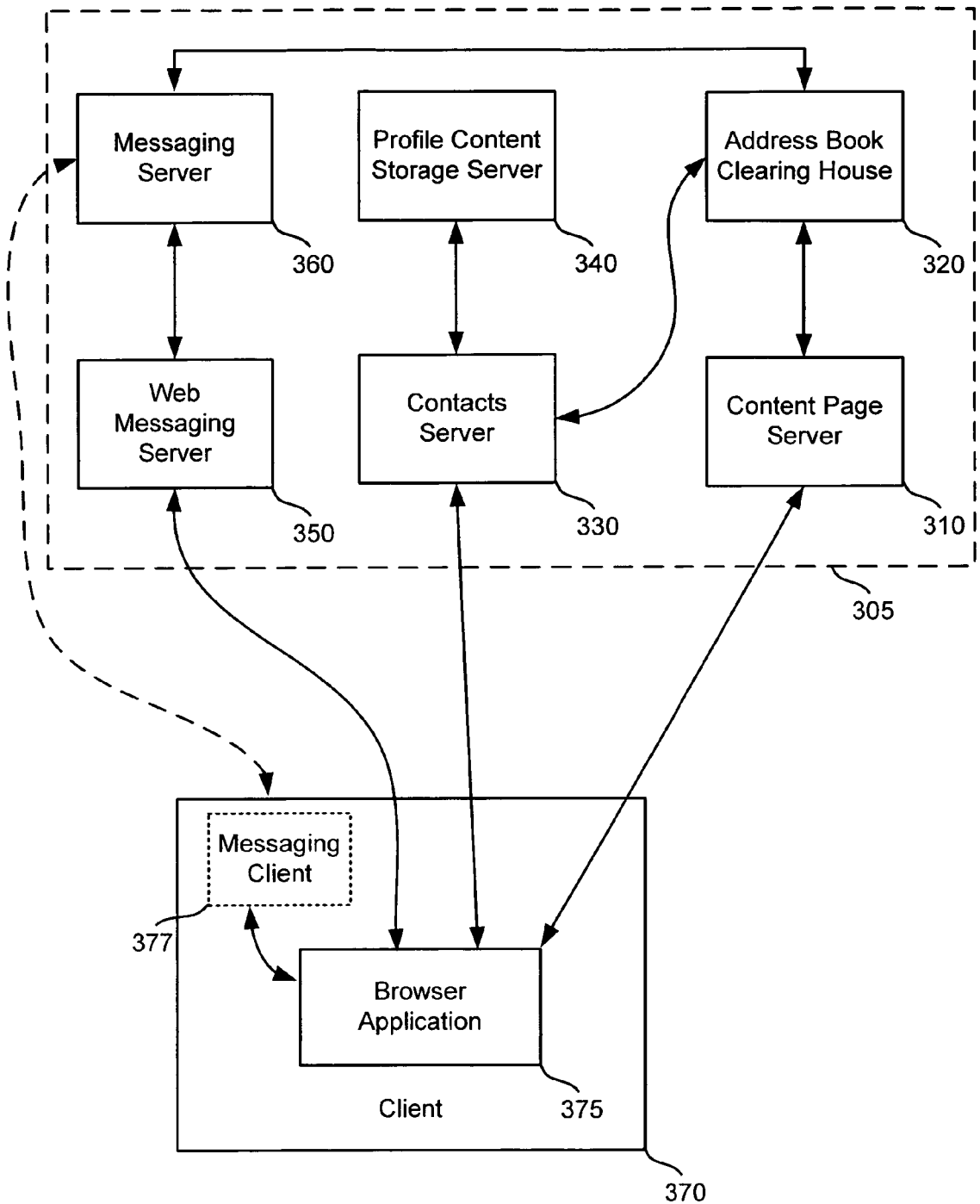
FIG. 3 illustrates an embodiment of a system for providing and managing a contact network.

FIG. 3 illustrates an embodiment of a system 305 for providing and managing a contact network. System 305 includes content page server 310, address book clearing house (ABCH) 320, contacts server 330, profile storage server 340, web messaging server 350, and messaging server 360. System 305 communicates with client 370. Client 370 includes browser application 375 and may include messaging client 377.

In general, system 305 may provide browser application 375 with information and data to provide a contact network interface. The contact network interface may allow a user to access and manage the user's contact network. The contact network interface may be accessed through a content page provided by a browser application. For example, the content page may be a web page, blog, or some other page provided by a web service for which the user has an account with.

Content page server 310 configures content page code for providing a contact network interface, such as that of FIG. 1 or 2. Content page server 310 may provide content page code to a requesting entity, such as browser application 375 of client 370. The content page code may be transmitted to the requesting entity through an XML feed, packaged as HTML, or a proprietary communication protocol means. The content page code provides a template or skeleton which the requesting entity may fill with contact list profile information. This is discussed in more detail below. Content page server 310 is in communication with ABCH 320 and browser application 375 of client 370.

ABCH 320 stores information associated with the user. The stored user information may include one or more contact lists for the user, user name and password information, a user reverse list and other information. The contact lists may include lists of one or more contacts with which the user has some type of relationship. For example, the contacts can be located in a user messaging service contact or buddy list, a mail service address book, or networking contact list. The reverse list may include a list of contacts that have the user on their contact list. The user may or may not have that contact in the user's contact list. If not, the relationship between the user and a contact in the user's reverse list is a one-way relationship. If the user does have the contact in the reverse list in this contact list as well, the contact and user have a two-way relationship. Other user information may be stored in ABCH 320 as well, such as user contact information (telephone, alternate email address, mailing address), lists of users memberships, user roles, mailing lists the user has chosen to be on, network services utilized, service configurations and preferences, permission information and other information. ABCH 320 may send and receive messages with content page server 310, contacts server 330, and messaging server 360. In one embodiment, messages are sent between ABCH 320 and content page server 310 using a SOAP interface. Operation of ABCH 320 is discussed in more detail below.

Contacts server 330 receives requests for profile data for one or more contacts. In one embodiment, contacts server 330 retrieves profile content information from profile storage server 340, processes and packages the information if necessary, and provides the profile content information to the requesting entity. Contacts server 330 may send and receive messages with profile storage server 340, ABCH 320, browser application 375. Operation of contacts server 330 is discussed in more detail below.

Profile storage server 340 stores profile data associated with users having an account with the communication service. Examples of profile data are illustrated in content page 100 of FIG. 1 and content page 200 of FIG. 2. In particular, the profile data may include a user thumbnail image or icon, a user name, whether the user has access to a messaging service or a mail service, a friend or contact count, and other information. Typically, profile storage server 340 receives requests from contacts server 330. The request can specify one or more contacts for which profile information is requested. Profile storage server 340 generates a response containing the requested profile data and transmits the response to contacts server 330. Operation of profile storage server 340 is discussed in more detail below.

Messaging server 360 brokers connections between messenger clients on different client machines, handles initial session connections, provides presence information and performs other tasks associated with a messaging service. Messaging server 360 may send and receive information with web messaging server 350 and messaging client 377. Operation of messaging server 360 is discussed in more detail below. Web messaging server 350 provides a portal to messaging server 360 for web-based messaging services. Web messaging server 350 is in communication with and may send and transmit messages with messaging server 360, ABCH 320 and browser application 375. Operation of web messaging server 350 and messaging server 360 is discussed in more detail below.

Browser application 375 of client 370 provides a contact network interface through which a user may access and manage a contact network. Browser application 375 processes input events associated with input received by a user at client 370. In doing so, browser application 375 retrieves contact network data from system 305 and provides it to a user.

As discussed above, profile information for a contact may include an online indicator. In some embodiments, the online indicator indicates whether the contact is logged in to an instant messaging service. To provide the online status for one or more contacts, the application providing the contact network interface must retrieve the online status of the contact(s) for messaging server 360. For a contact network interface provided by browser application 375, browser application 375 will first determine whether messaging client 377 is currently running or installed on client 370. If messaging client 377 is running or installed on client 370, browser application 375 will query messaging client 377 to determine if contacts within the current contact network interface display are currently logged into the messaging service. Otherwise, browser application will make the determination through web messaging server 350. Operation of browser application 375 and messaging client 377 are discussed in more detail below.

Figure 4:
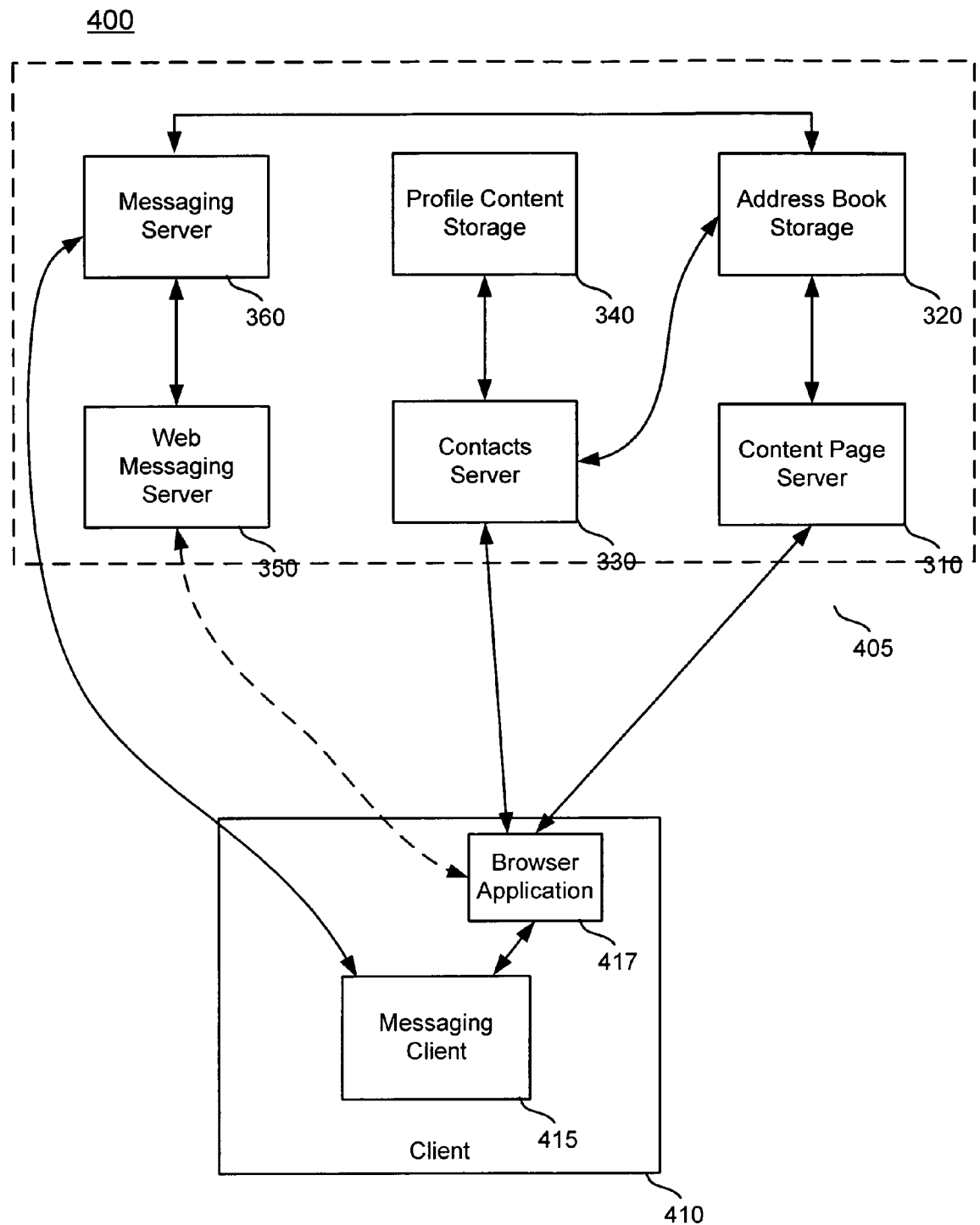
FIG. 4 illustrates an embodiment of an electronic messaging system for providing and managing a contact network.

FIG. 4 illustrates an embodiment of an electronic messaging system 405 for providing and managing a contact network. System 405 contains the same elements of system 305 of FIG. 3. However, client 410 includes messaging client 415 and browser application 417. Client 410 of FIG. 4 may send and receive messages with system 405.

In the embodiment illustrated in FIG. 4, a user is initially provided with an instant messaging interface provided by messaging client 415. An example of a messaging interface provided by messaging client 415 is illustrated by interface 1610 of FIG. 16, and discussed in more detail below. Typically, messaging client 415 receives user input through a messaging interface. The input indicates that the user has selected to view a contact list associated with one of the user's contacts. In response to the input, messaging client 415 generates a contact network interface. The contact network interface is provided through a browser application. In one embodiment, messaging client 415 opens a new window for browser application 417 and initiates browser application 417 to provide the contact network interface. Browser application 417 then retrieves contact list profile information and other data from system 405. Messaging client 415 can retrieve messaging service information for any contact within the selected contact's contact list. This information is then provided from messaging client 415 to browser application 417. The contact's contact list is then provided to the user through a contact network interface provided by browser application 417.

Figure 5:
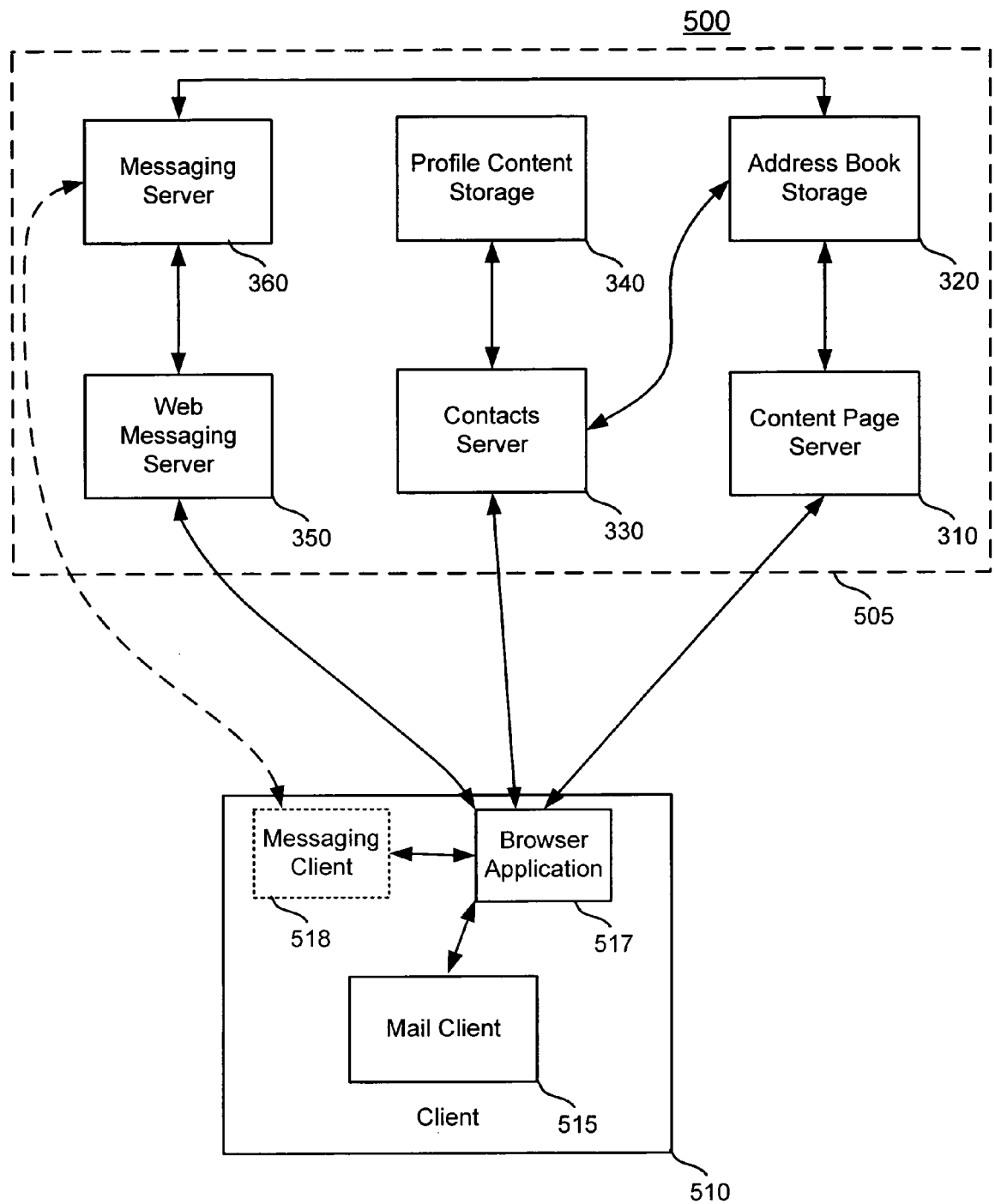
FIG. 5 illustrates an embodiment of an electronic mail system for providing and managing a contact network.

FIG. 5 illustrates an embodiment of an electronic mail system 505 for providing and managing a contact network. System 505 includes the same elements as system 305 of FIG. 3 and system 405 of FIG. 4. Client device 510 includes mail client 515, browser application 517 and messaging client 518. Client 510 may send and receive messages with system 505.

Initially, a user is provided with a mail system interface by mail client 515. Once mail client 515 receives input indicating a user has selected to view the user contact list or a contact list associated with one of the user's contacts, mail client 515 initiates browser application 517 to display a contact network interface. Browser application 517 then retrieves profile information for the contacts within the appropriate contact list. Additionally, browser application 517 will determine whether messaging client 518 is currently running or installed on client 510. If messaging client 518 is currently running or installed on client 510, browser application 517 will determine if any of the contacts within the current contact list are signed in to a messaging service through messaging server 360 via messaging client 518. Otherwise, browser application 517 will determine the online status of the contacts in the messaging service through web messaging server 350. This is discussed in more detail below.

Figure 6:
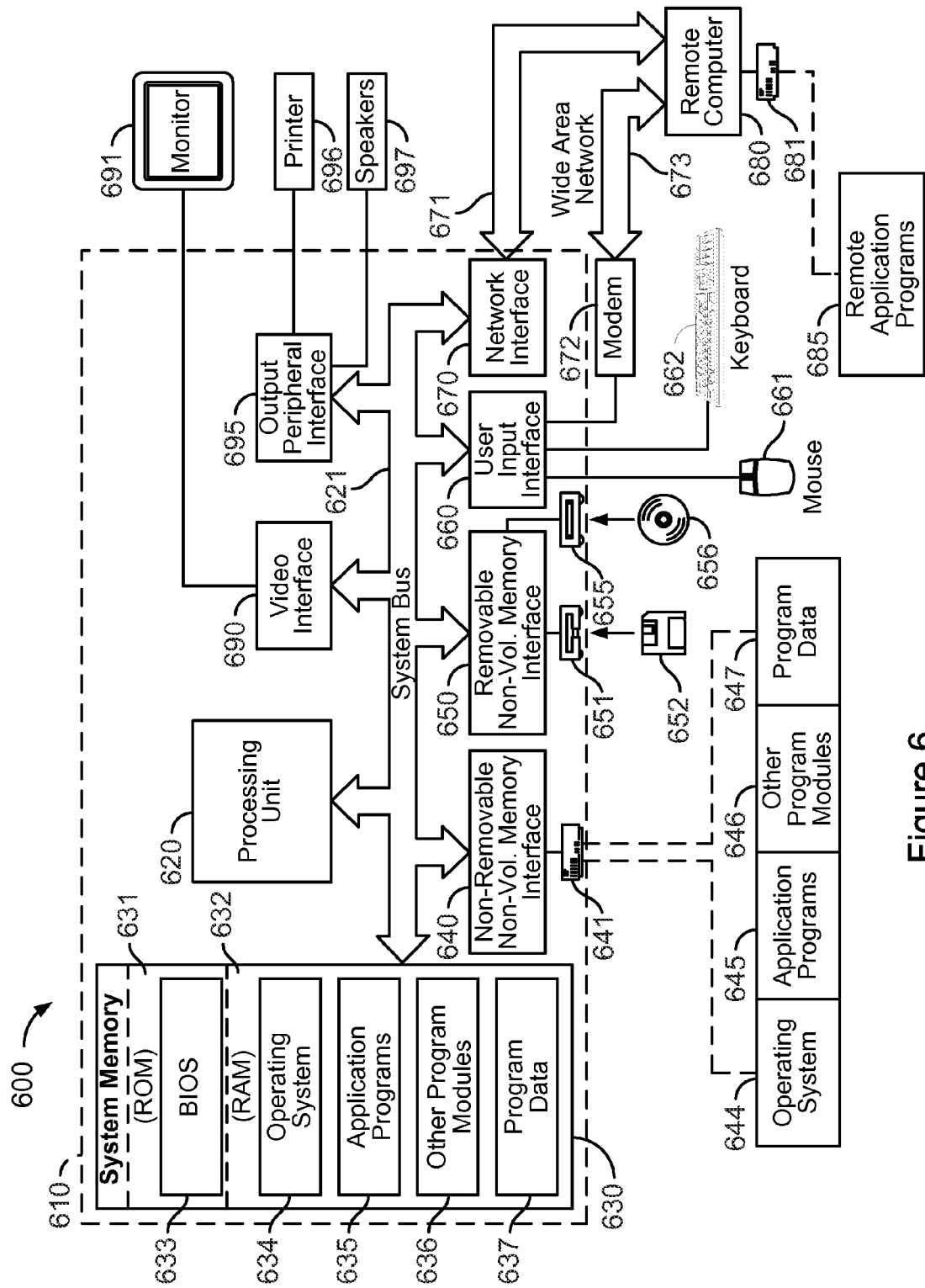
FIG. 6 illustrates an embodiment of a computing environment for implementing the present technology.

FIG. 6 illustrates a computing environment 600 for implementing the present technology. In one embodiment, the computing environment 600 may implement the servers of systems 305, 405 and 505 as well as client devices 410, 510 and 370.

Computing environment 600 is only one example of a suitable computing environment and is not intended to suggest any limitation as to the scope of use or functionality of the technology herein. Neither should the computing environment 600 be interpreted as having any dependency or requirement relating to any one or combination of components illustrated in the exemplary operating environment 600.

The technology described herein is operational with numerous other general purpose or special purpose computing system environments or configurations. Examples of well known computing systems, environments, and/or configurations that may be suitable for use with the technology herein include, but are not limited to, personal computers, server computers, hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

The technology herein may be described in the general context of computer-executable instructions, such as program modules, being executed by a computer. Generally, program modules include routines, programs, objects, components, data structures, etc., that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

With reference to FIG. 6, an exemplary system for implementing the technology herein includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 640 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through an non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 60 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through a output peripheral interface 690.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

Figure 7:
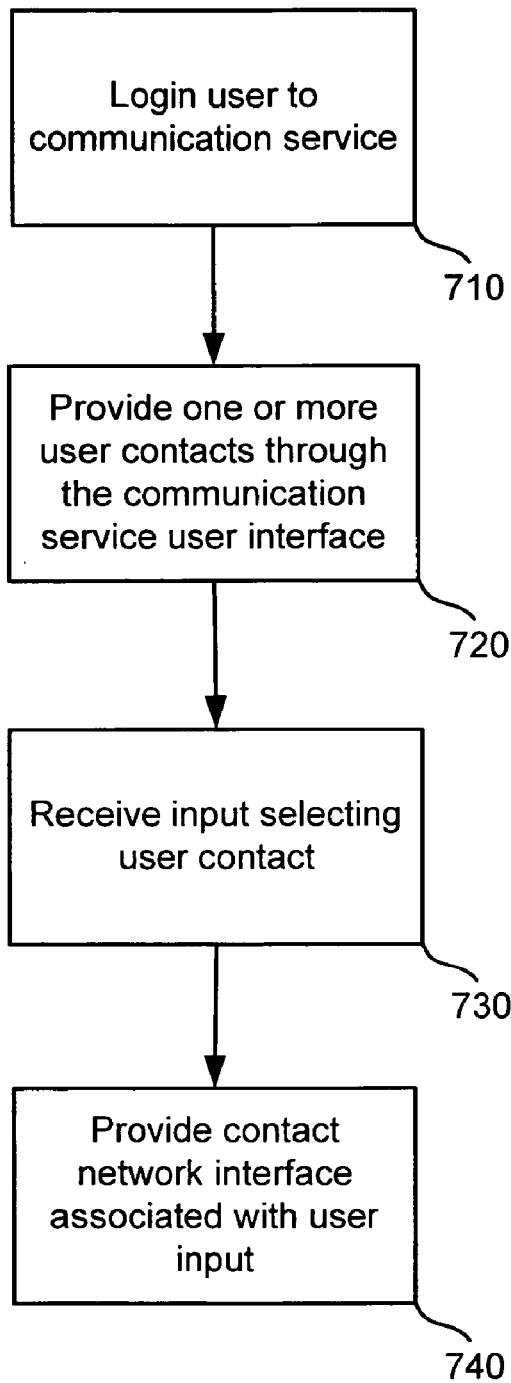
FIG. 7 illustrates an embodiment of a method for providing a contact network through a communication service.

FIG. 7 illustrates an embodiment of a method 700 for providing a contact network through a communication service. First, the user is logged in to a communication service at step 710. The communication service may be an instant messaging service, an electronic mail service, a service providing a content page (such as a content page with a blog, photo album or other contact lists), or some other communication service. Next, a link to the user or one or more contacts is provided through a user interface for the communication service at step 720. In one embodiment, the one or more contacts may be provided through a messaging service interface in the form of a buddy list. In another embodiment, the one or more contacts may be provided through an electronic mail service through a contact address book or inbox interface. In another embodiment, the contact may be provided through a content page interface that provides a blog.

Input selecting the user contact is then received through the user interface at step 730. Next, a contact network interface is provided which is associated with the user input at step 740. The contact network interface provides a contact list for the contact selected at step 730. Thus, the contact list provided is associated with the selected contact, not the user. Step 740 of FIG. 7 is discussed in more detail below in method 800 of FIG. 8.

Figure 8:
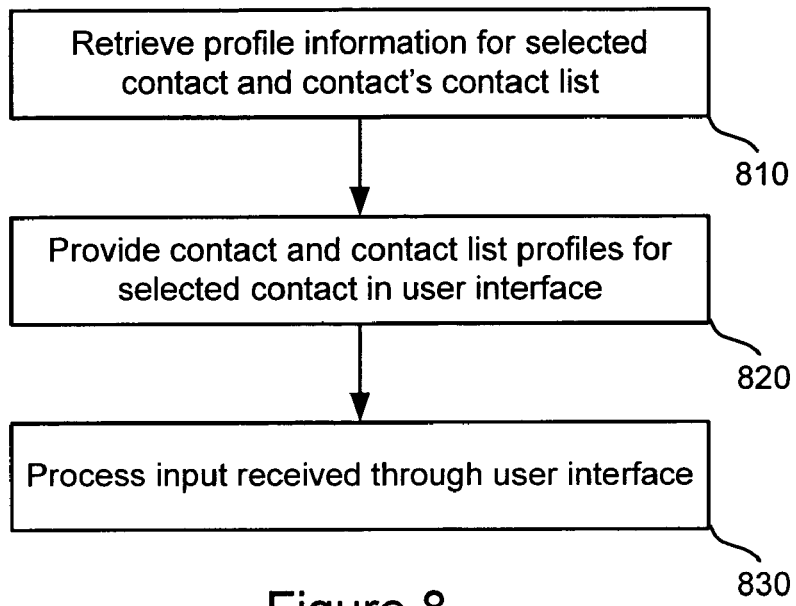
FIG. 8 illustrates an embodiment of a method for providing a contact list associated with a user-selected contact.

FIG. 8 illustrates an embodiment of a method 800 for providing a contact list associated with a user-selected contact. In one embodiment, method 800 provides more detail of step 740 of FIG. 7. First, profile information for a selected contact and the contact's contact list is retrieved at step 810. Contact list profile information may include a thumbnail image or photo of a particular contact, the contact name, online information (whether the contact is signed in to a messaging service), contact page update information, contact location, or other information.

As discussed above, content page update information may indicate whether the contact has updated a content page associated with the user. In one embodiment, the selected contact's profile information may include the type of information provided in profile information window 220 of FIG. 2. The contact list profile information may include the type of information provided in the contact list information window 230. Step 810 of FIG. 8 is discussed in more detail below with respect to method 900 of FIG. 9.

Contact and contact list profiles are provided for a selected contact in the user interface at step 820. In one embodiment, a content page is instantiated with profile information for the selected contact and the contacts in the selected contact's contact list. The interface is provided as a content page in a browser application, such as browser application 375 of client 370.

Figure 13:
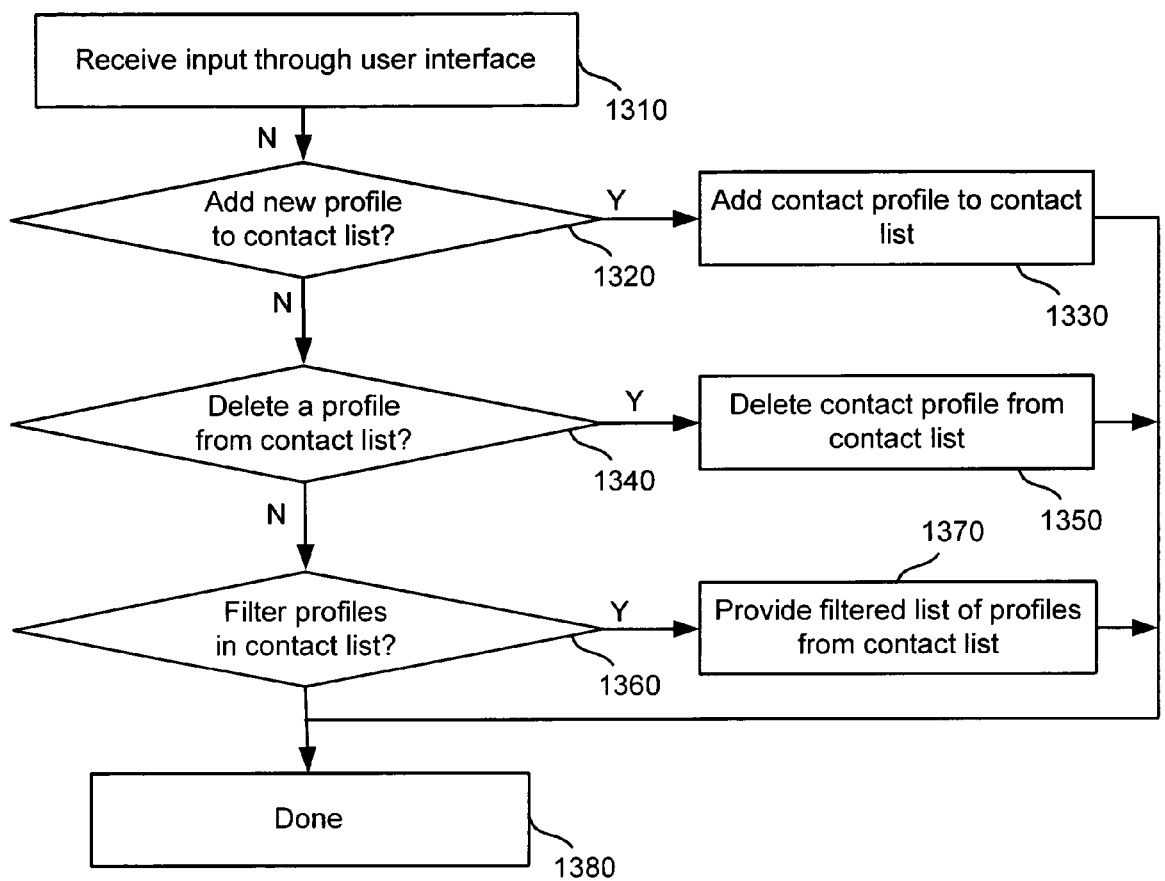
FIG. 13 illustrates an embodiment of a method for processing input received through a user interface.

Input received from the user interface is then processed at step 830. Processing user input may include adding or deleting profiles, processing user input to filter profiles, or other tasks performed in response to received input. Processing input as illustrated by step 830 is discussed in more detail below with respect to method 1300 of FIG. 13.

Figure 9:
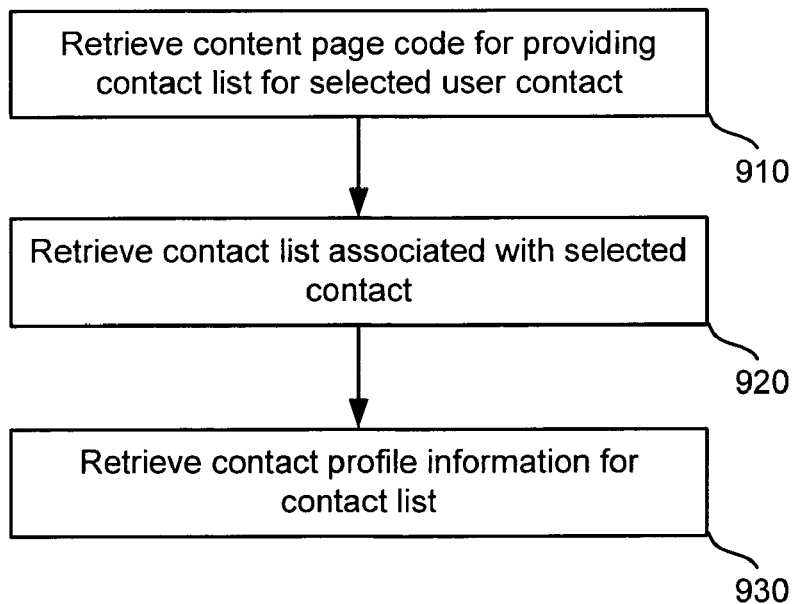
FIG. 9 illustrates an embodiment of a method for retrieving a selected contact's contact list profile information.

FIG. 9 illustrates an embodiment of a method 900 for retrieving profile information for a selected contact's contact list. In one embodiment, method 900 of FIG. 9 provides more detail of step 810 of method 800. Content page code for providing profile information for a selected user's contact and the contact's contact list is retrieved at step 910. In one embodiment, the content page code is retrieved by a client application from the content page server of a particular communication system. The client application may be a browser application, a messaging client, a mail client or some other application on a client device. For purposes of discussion, methods of FIG. 9 through FIG. 15 will be discussed with respect to system 305 of FIG. 3. Step 910 is discussed in more detail below with respect to method 1000 of FIG. 10.

A contact list associated with the selected contact is retrieved at step 920. In one embodiment, the contact list is retrieved by an application residing on the client (such as browser application 375) from ABCH 320. In another embodiment, the contact list may be retrieved indirectly through content page server 310. Retrieval of the contact list associated with the selected contact is discussed below in more detail with respect to method 1100 of FIG. 11. Contact profile information for contacts within the contact list is retrieved at step 930. The contact profile information is retrieved by a client application (such as browser application 375) from contacts server 330 and messaging server 360. In one embodiment, the information may be retrieved from messaging server 360 directly or indirectly through web messaging server 350. Retrieval of contact profile information at step 930 is discussed in more detail below with respect to method 1200 of FIG. 12.

Figure 10:
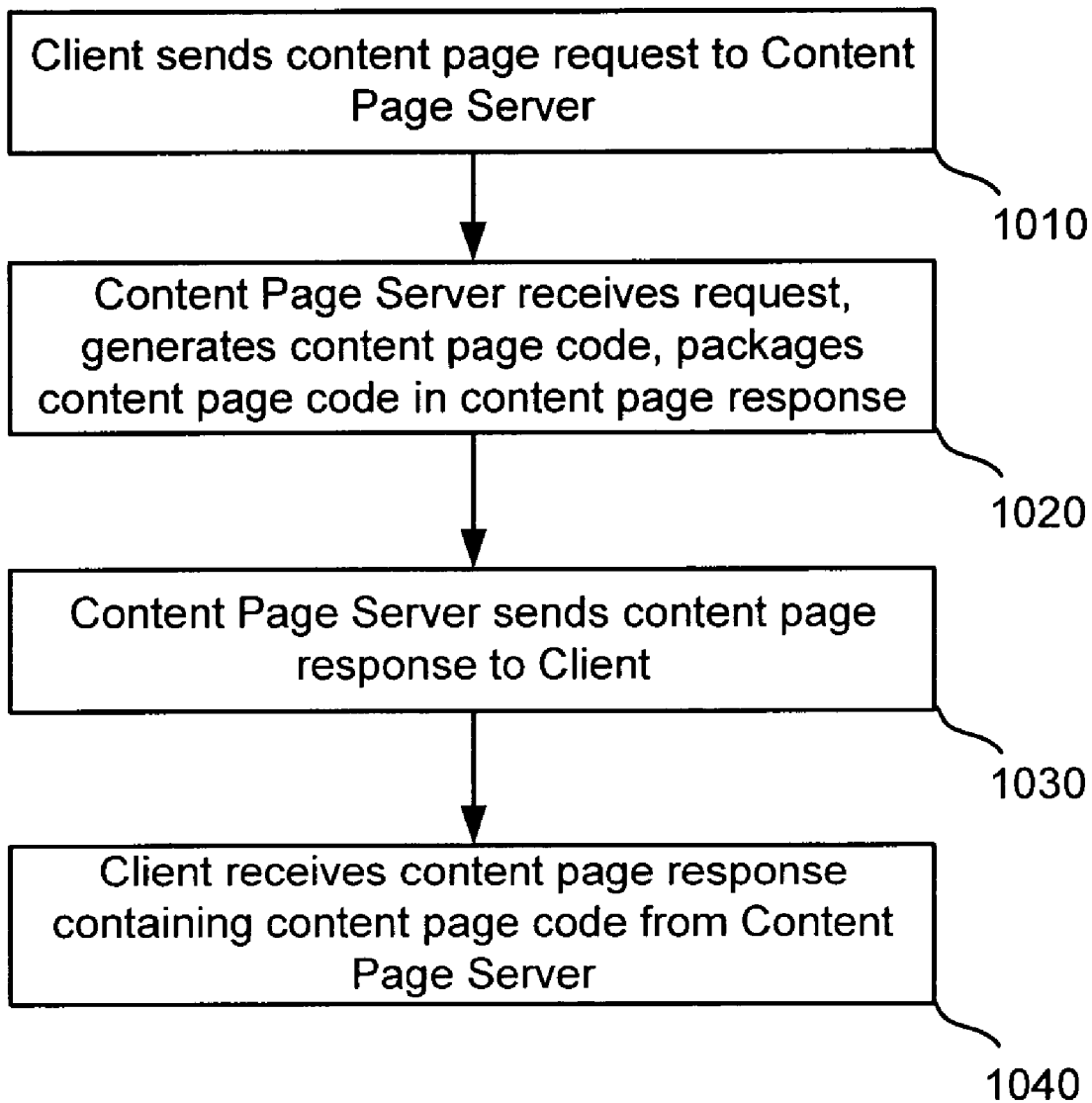
FIG. 10 illustrates an embodiment of a method for retrieving content page code for providing a contact list for a selected user contact.
Figure 11:
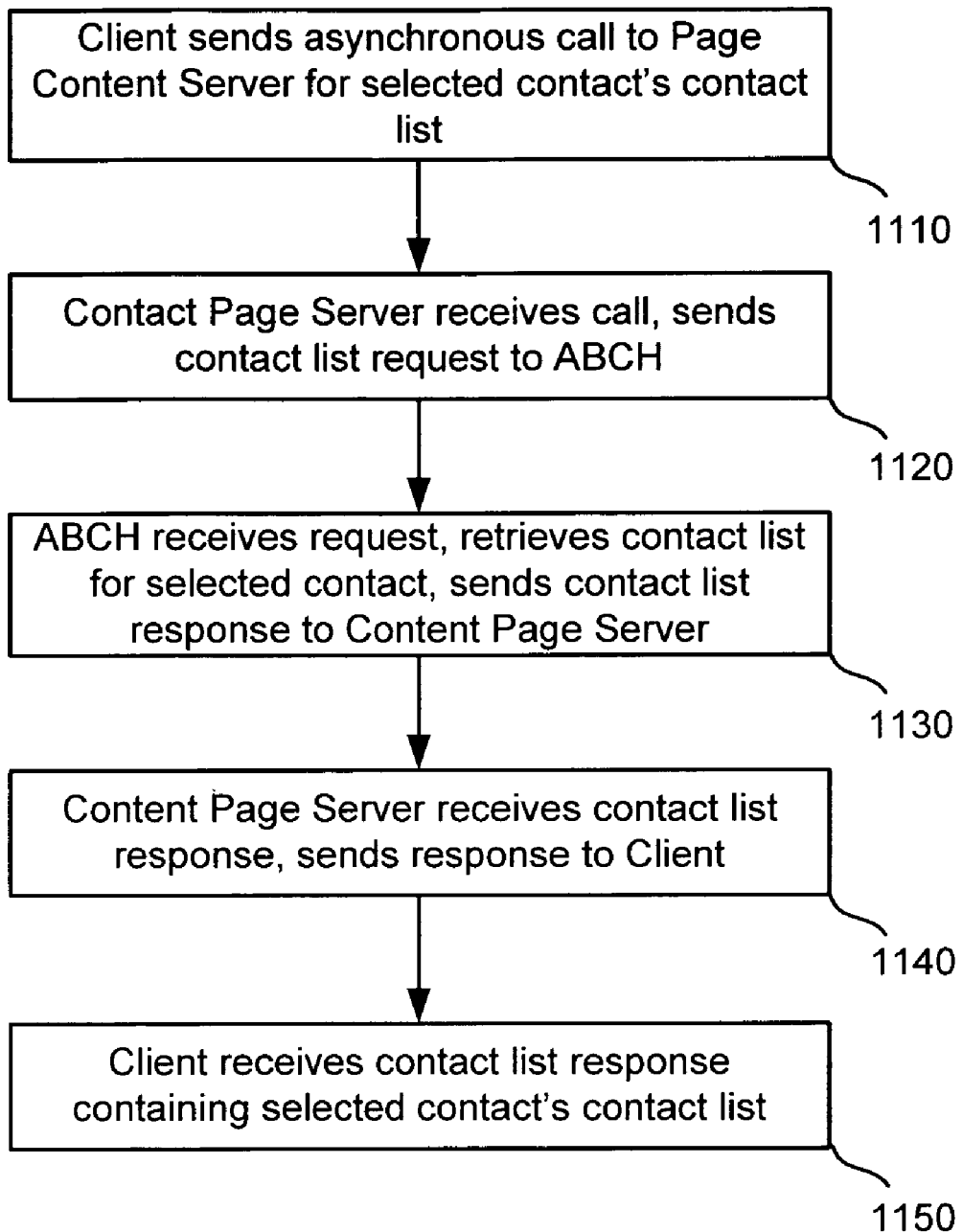
FIG. 11 illustrates an embodiment of a method for retrieving a contact list associated with a selected contact.

FIG. 10 illustrates an embodiment of a method 1000 for retrieving content page code for providing a contact network interface associated with a selected user contact. In one embodiment, method 1000 provides more detail for step 910 of method 900 discussed above. First, a content page request is sent from client 370 to content page server 310 at step 1010. With respect to system 305, the content page request may be sent by browser application 375 to content page server 310. The content page request may be sent in response to input received from a user. Content page server 310 receives the request, generates content page code, and packages the content page code in a content page response at step 1020. The content page code may be a template or skeleton for a contact network interface. Next, content page server 310 sends the content page response to browser application 375 at step 1030. In one embodiment, content page server 310 may send the content page response as a SOAP message. In another embodiment, the response may be in XML format. Client 370 receives the content page response containing the content page code from content page server 310 at step 1040. In one embodiment, a client application such as browser application 375 may receive the content page response FIG. 11 illustrates an embodiment of a method 1100 for retrieving a contact list associated with a selected contact. In one embodiment, method 1100 provides more detail for step 920 of method 900. Browser application 375 sends an asynchronous call to content page server 310 for a selected contact's contact list at step 1110. In one embodiment, the contact list is associated with a contact selected by a user at step 730 of method 700. The request may include the contact's user-name, a password associated with the contact, and other information. The contact user-name and password may be retrieved from browser application 375. In other embodiments, the contact username and password may be retrieved from the application running on the client in which the user input was received. Content page server 310 receives the call and sends a contact list request to ABCH 320 at step 1120. The contact list request sent to ABCH 320 includes the user name and password information received by content page server 310 at step 1110. Next, ABCH 320 receives the request, retrieves the contact list for the selected contact, and sends the contact list response to content page server 310 at step 1130. In one embodiment, ABCH 320 will first confirm the validity of the user before sending the contact list response to content page server 310. In this case, ABCH 320 will confirm that the user name exists and that the password is associated with that particular user.

Content page server 310 receives the contact list response from ABCH 320 and forwards the response to browser application 375 at step 1140. In one embodiment, the response may be processed by the content page server 310 before being transmitting to browser application 375. For example, content page server 310 may process the response to place the response in a format more easily processed by browser application 375. Browser application 375 receives the contact list response containing the selected contact list at step 1150. In one embodiment, after the browser application 375 receives the contact list response, contact data from the contact list are inserted into the contact network interface provided by browser application 375.

As discussed above, a contact network interface provided by an application on the client device may provide online information for the user and contacts in the currently displayed contact list. The online information may indicate whether the user and any contacts are currently logged-in to a communication service, such as an instant messaging service, mail service, or other service. An instant messaging service is considered for purposes of example herein. In order to determine online status for an instant messaging service, the application providing the interface may access a messaging server, such as messaging server 360 of FIG. 1. The messaging server may be accessed directly from an application on a client device or indirectly through a web messaging server. Further, the application providing the contact network interface may send a contact list presence request from the client directly or initiate another application on the client to send the presence request. Determining the online status for a user and contacts within a contact list is discussed in more detail with respect to method 1200 of FIG. 12.

Figure 12:
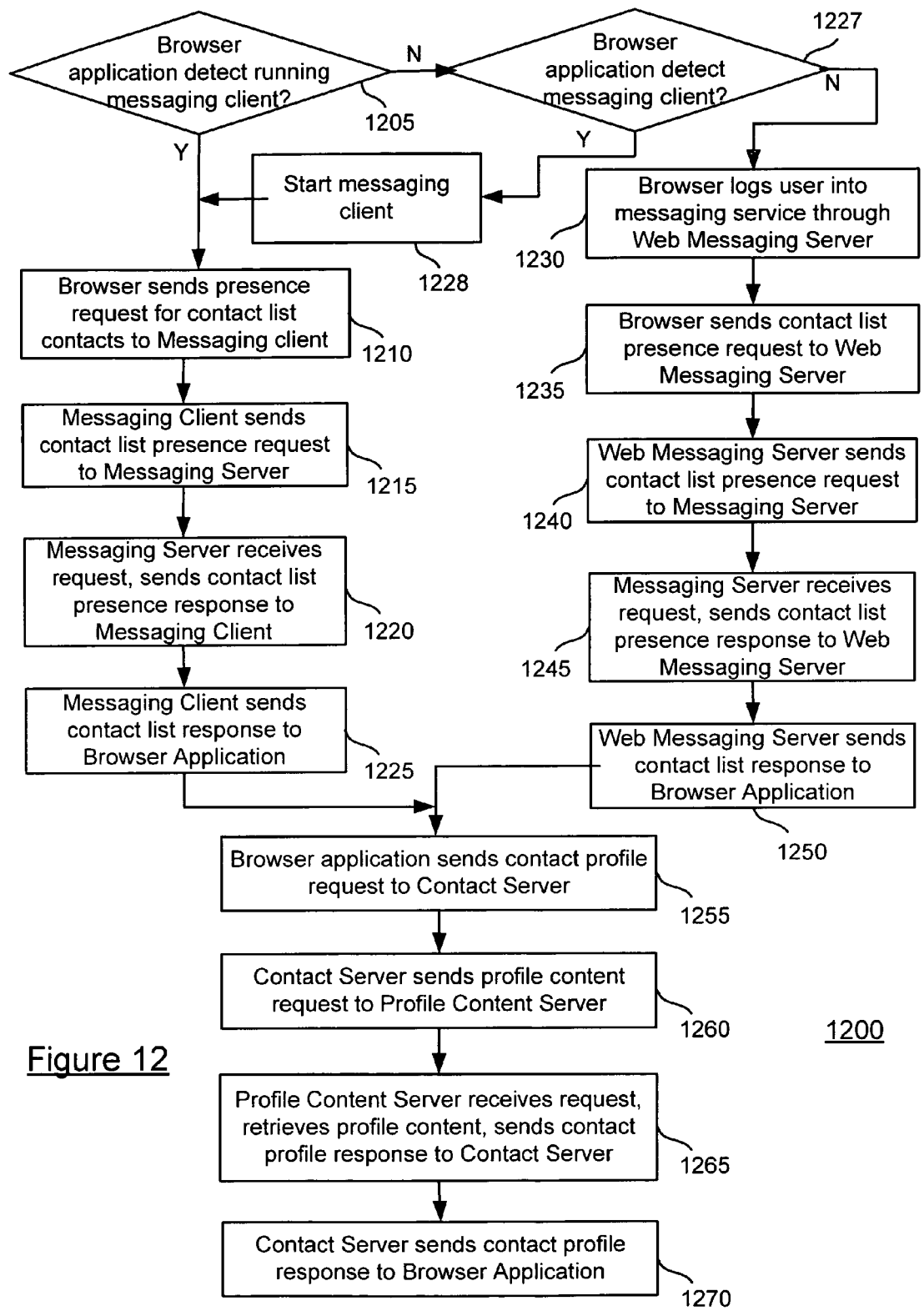
FIG. 12 illustrates an embodiment of a method for retrieving contact profile information for a contact list.

FIG. 12 illustrates an embodiment of a method 1200 for retrieving contact profile information for a contact list. In one embodiment, method 1200 provides more detail for step 930 of method 900. First, a determination is made as to whether messaging client 377 is detected to be running on client 370 at step 1205. In some embodiments, other client applications may make this determination (such as applications 415 and 515 of FIGS. 4 and 5, respectively). If browser application 375 determines that the messaging client is running on client 375 at step 1205, operation continues to step 1210. Otherwise, operation continues to step 1227.

At step 1210, browser application 375 sends a presence request for contact list contacts to messaging client 377 at step 1210. The presence request includes the identification information for the contacts within the contact list. In one embodiment, the contact identification information is received from ABCH 320 at step 1150 of method 1100. Messenger server 360 may determine if any of the contacts are signed into the messaging service from the identification information. The messaging client then sends a contact list presence request to messaging server 360 at step 1215. Messaging server 360 receives the request, determines which of the listed contacts are signed in, and sends a contact list response to messaging client 377 at step 1220. The contact list response indicates which of the contacts are signed into the messaging service. Messaging client 377 then sends the contact list response to browser application 375 at step 1225. Operation then continues to step 1255.

If no messaging client application is determined to be running on client 370 at step 1205, determination is made at step 1227 as to whether a messaging client exists on client

370. If no messaging client exists, operation continues to step 1230. If a messaging client exists, the client application is loaded, executed, ant the user is signed into the instant messaging service at step 1228. Operation then continues to step 1210.

Browser application 375 logs the user into the messaging service through web messaging server 350 at step 1230. Next, browser application 375 sends a contact list presence request to web messaging server 350 at step 1235. In one embodiment, the contact identification information is received from ABCH 320 at step 1150 of method 1100. Web messaging server 350 then sends a contact list presence request to messaging server 360 at step 1240. Messaging server 360 receives the request, generates a contact list presence response, and sends the contact list presence response to web messaging server 350 at step 1245. The response includes information indicating whether each contact listed in the request is currently logged into the instant messaging service. Web messaging server 350 then sends the contact list presence response to browser application 375 at step 1250. Operation then continues to step 1255.

Browser application 375 sends a contact profile request to contact server 330 at step 1255. The contact profile request is used to retrieve contact profile information for contacts in the contact list. In one embodiment, the contacts listed in the request are those received from ABCH 320 at step 1150 of method 1100. Contact profile information may include thumbnail images associated with a contact as well as other information. In some embodiments, a contact profile request is sent to contact server 330 in parallel with steps 1250 or step 1225. In this case, the retrieval is triggered by retrieval of the contact list by content page server 310.

Next, contact server 330 sends the profile content request to the profile storage server 340 at step 1260. Profile storage server 340 receives the request and sends a contact profile response to contact server 330 at step 1265. In particular, profile content storage server 340 retrieves the contact profile information and packages the profile information in the contact profile response. The contact profile response includes the profile information for the named contacts in the contact profile request. Contact server 330 then sends the contact profile response to browser application 375 at step 370. Thus, by retrieving contact list data from content page server 310, online status data from messaging server 360, and additional contact list (such as address book data) profile information from contacts server 330, information derived from the data is merged to provide a content page update, online status, profile image, and email address for the appropriate contacts.

After the contact network interface is provided to the user, the application providing the interface may process input received from a user. Method 1300 illustrates an embodiment of a method 1300 for processing input received through a contact network interface. In one embodiment, method 1300 provides more detail for step 830 of method 800 discussed above. First, user input is received through a contact network interface at step 1310. Next, a determination is made as to whether a new profile is to be added to a contact list in response to the user input at step 1320. In one embodiment, a new profile is to be added to a contact list if input is received from a user indicating that a new profile is to be added. If a new profile is to be added, operation continues to step 1330. If a new profile is not to be added at step 1320, operation continues to step 1340. At step 1330, a contact profile is added to the contact list at step 1330. This is discussed in more detail below with respect to method 1400 of FIG. 14. Operation then continues to step 1380.

A determination is made at step 1340 as to whether a profile from the contact list should be deleted. In one embodiment, a profile should be deleted from the contact list if user input is received indicating that a profile should be deleted. If the determination is made that a profile should be deleted from the contact list at step 1340, operation continues to step 1350. Otherwise operation continues to step 1360. At step 1350, a contact profile is deleted from the contact list. This is discussed in more detail below with respect to method 1500 of FIG. 15. Operation then continues to step 1380.

In one embodiment, user may filter a view of contact profiles using a combination of keywords. A user may associate one or more key words with one or more profiles. The key words may be dynamically created by the user or selected from a pre-existing list. Once selected, the keywords may be associated with one or more profiles. For example, a user may generate a key word "business". The user may then associate one or more profiles with the key word "business", thereby indicating that those profiles, or contacts, are related to the user's business. In another embodiment, the user may similarly characterize profiles with a keyword of "family", "friends", or "play". Once profiles are associated with key words, a user may filter the profiles by selecting one or more key words. In this case, only the profiles associated with those key words will be displayed in the interface. Similarly, someone who is viewing the contacts (besides the users associated with the contacts) may filter a view of the contacts using the contact's keywords as well. At step 1360, a determination is made as to whether the contact list profiles should be filtered. If determination is made at step 1360 that profiles in the contact list are to be filtered, operation continues to step 1370 where a filtered list of profiles in the contact list is provided. Operation then ends at step 1380. If profiles in the contact list are not to be filtered, operation then ends at step 1380.

Figure 14:
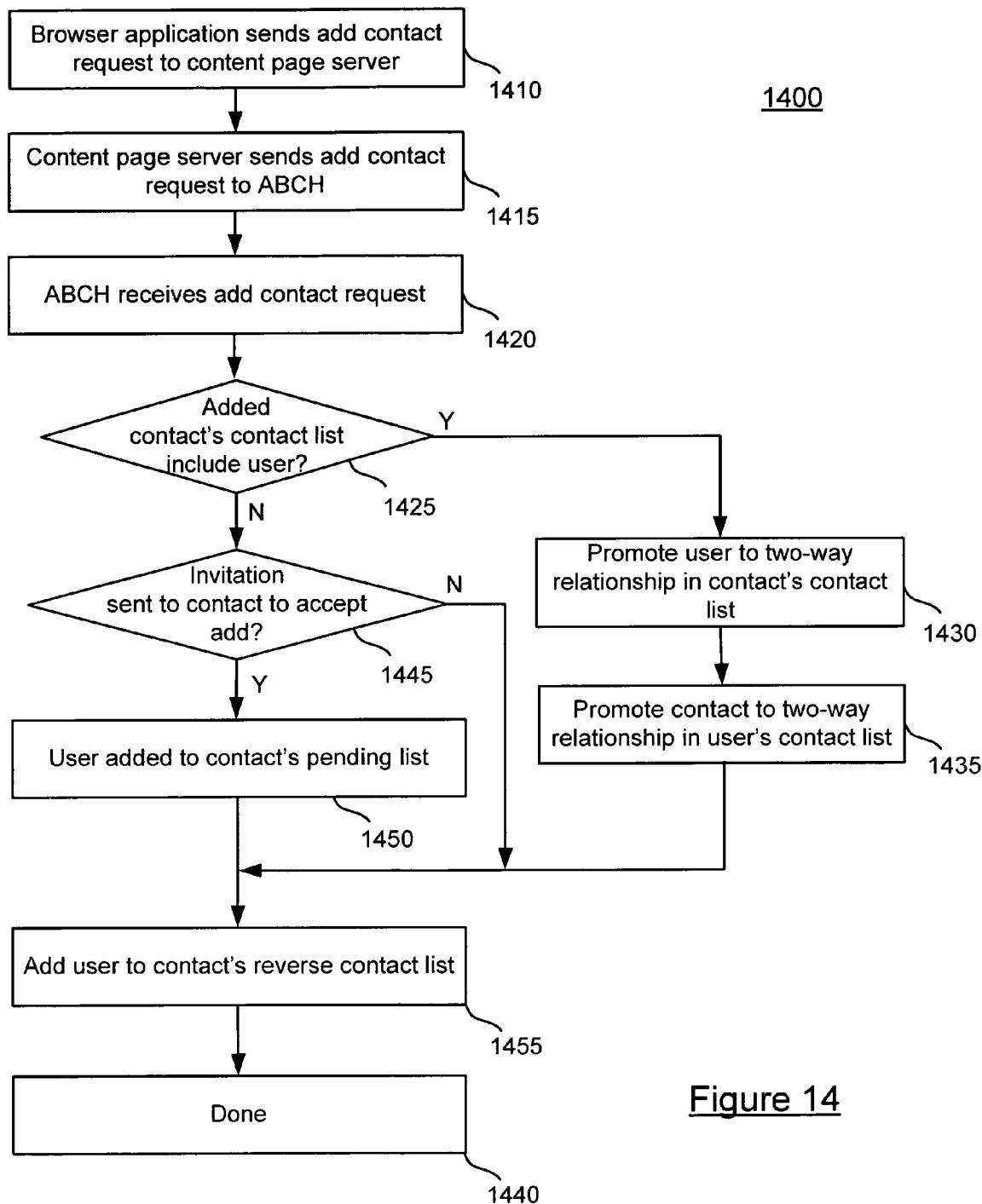
FIG. 14 illustrates an embodiment of a method for adding a contact profile to a contact list.

FIG. 14 illustrates an embodiment of a method 1400 for adding a contact profile to a user's contact list. In one embodiment, method 1400 provides more detail of step 1330 of method 1300. First, browser application 375 sends an add contact request to content page server 310 at step 1410. The request indicates that a contact should be added to the user's contact list. The request may include identification information for the user and the contact to be added. In one embodiment, the request is sent in response to receiving user input indicating that a selected contact should be added to the user's contacts. Content page server 310 then sends an add contact request to ABCH 320 at step 1415. The add contact request sent by browser application 375 may include the same identification information as that sent by content page server 310. ABCH receives the add contact request at step 1420.

Upon receiving the add contact request, ABCH 320 may perform one or more operations. First, a determination is made at step 1425 as to whether the contact's contact list includes the user. In one embodiment, ABCH 320 retrieves the contact's contact list to make this determination. If the contact list of the contact to be added includes the user, operation continues to step 1430. If the contact's contact list does not include the user, operation continues to step 1445. ABCH 320 sets the user-contact relationship to a two-way relationship in the contact's contact list at step 1430. The two-way relationship indicates that the user and contact have each other in their respective contact lists. Next, ABCH 320 sets the contact-user relationship to a two-way relationship in the user's contact list at step 1435. The user is added to the contact's reverse contact list at step 1440. As mentioned above, a reverse contact list is a list maintained by ABCH 320 for each user account. The reverse contact list indicates other users which maintain the user in their contact list. Operation then continues to step 1455.

At step 1445, a determination is made as to whether an invitation was sent to the contact. In one embodiment, when a user provides input to add a contact, the user may also indicate that an invitation should be sent to the added contact to query whether or not the contact would like to add the user to the contact's contact list. If an invitation was sent at step 1445, operation continues to step 1450. If no invitation was sent, operation continues to step 1455. At step 1450, the user is added to the contact's pending list. A pending list is a list of pending invitations for a particular contact or user. For each invitation in the pending list, a contact may provide input to accept or reject the new contact in the contact's contact list. Operation then ends at step 1455.

Figure 15:
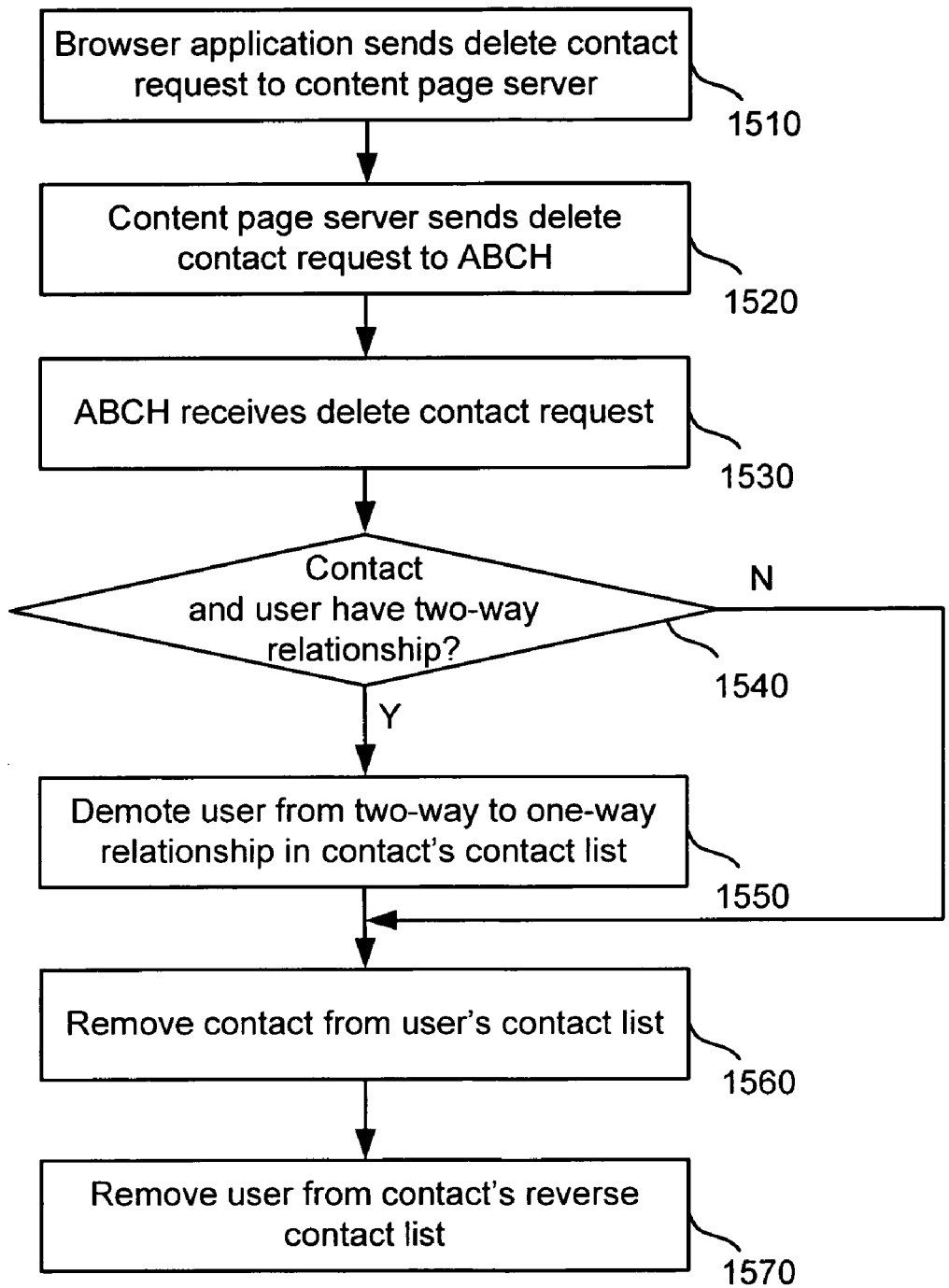
FIG. 15 illustrates an embodiment of a method for deleting a contact profile from a contact list.

FIG. 15 illustrates an embodiment of a method 1500 for deleting a contact profile from a contact list. In one embodiment, method 1500 illustrates more detail of step 1350 from method 1300 above. First, browser application 375 sends a delete contact request to content page server 1510. In one embodiment, the delete contact request is sent in response to receiving user input indicating that a selected contact should be deleted from the user's contact list. The delete contact request includes identification information for the contact to be deleted (such as identification information for the user and the contact). After receiving the delete contact request from browser application 375, content page server 310 sends a delete contact request to ABCH 320 at step 1520. In one embodiment, the request sent by content page server 310 to ABCH 320 contains the same user and contact identification information as the request received by content page server 310. ABCH 320 receives the delete contact request at step 1530.

A determination is made as to whether the contact and the user have a two-way relationship at step 1540. In one embodiment, this determination is made by ABCH 320. In this case, ABCH 320 may check the contact lists associated with both the contact and the user to determine if they each have the other in their contact list. If the contact and user have a two-way relationship at step 1540, operation continues to step 1550. If the contact and user do not have a two-way relationship, operation continues to step 1560. At step 1550, the user is demoted from a two-way to a one-way relationship in the contact's contact list. Operation then continues to step 1560 where the contact is removed from the user's contact list. The user is then removed from the contact's reverse contact list at step 1570.

Figure 16:
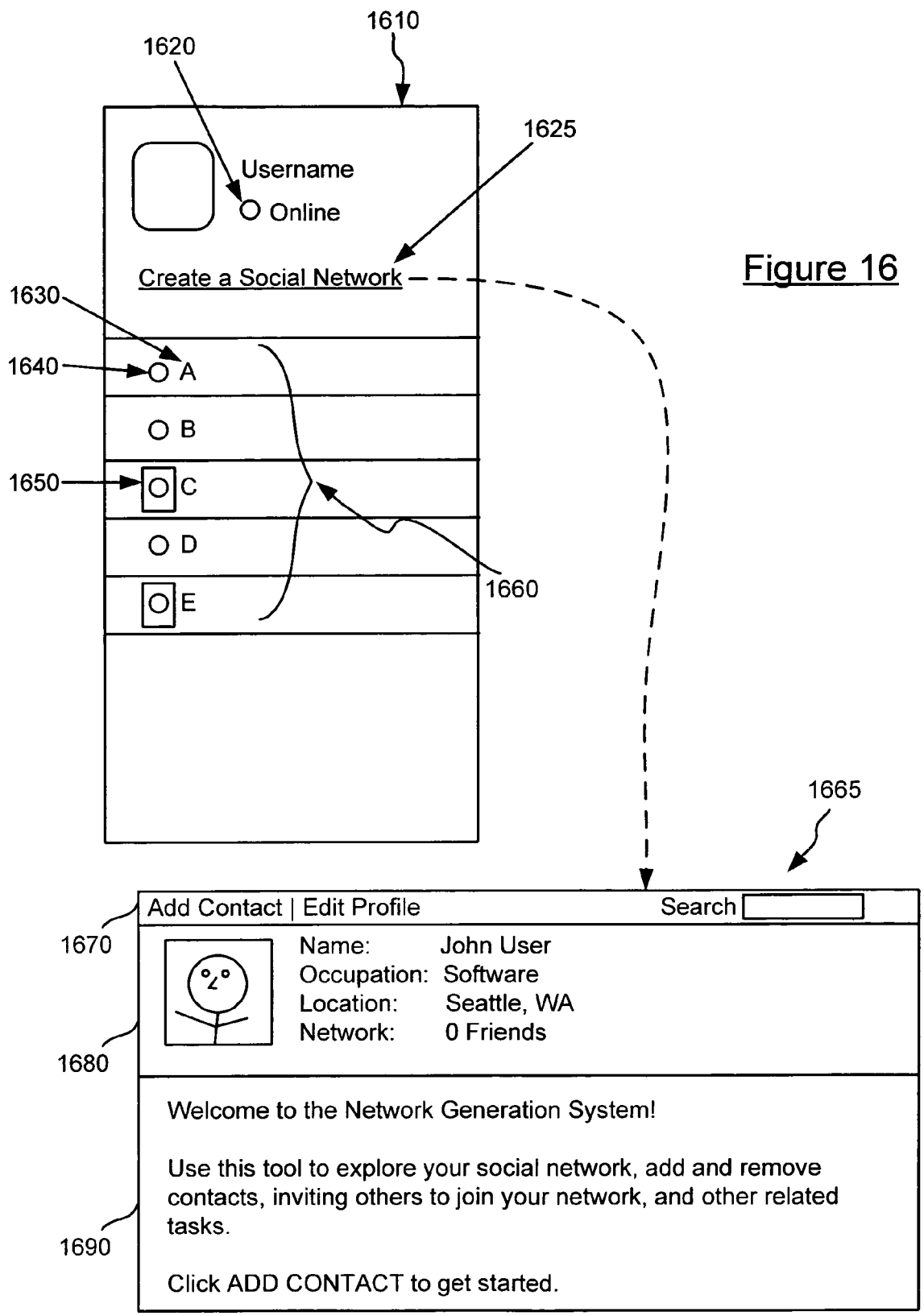
FIG. 16 illustrates an embodiment of an electronic messaging interface and content page for accessing a contact network.

Contact networks can be accessed from several interfaces within different communication services. These communication services include instant messaging services, electronic mail services, content page management services, and other services. Each service is provided through one or more interfaces from which a contact network can be accessed. FIG. 16 illustrates an embodiment of an electronic messaging interface 1610 for accessing a contact network and a contact network interface 1665. Interface 1610 includes user online indicator 1620 and a user contact list (or buddy list) 1660. Contact list 1660 consists of contacts identified as A-E. Each contact in the contact list is represented by a username, such as username 1630 "A." Additionally, each contact may be associated with an online indicator and content page indicator, such as online indicator 1640 and content page indicator 1650. An online indicator indicates whether the user or contact is currently logged into the messaging service. A content page indicator may indicate whether the user or contact has a content page associated with their account with the communication service, and optionally whether the content page has been updated since the user last viewed it.

Within interface 1610 is a "create a social network" link 1625. Upon receiving input selecting link 1625, a user may be provided with a contact network interface, such as contact network interface 1665. Contact network interface 1665 includes header window 1670, profile information window 1680, and contact list information window 1690. The content of contact list information window 1690 indicates that the user may provide input to generate a contact network. Thus, the user currently has no contacts as displayed in the contact network interface window 1665. If the user already had a contact network configured (i.e., the user had a contact list), a contact network interface similar to interface 100 of FIG. 1 would be provided in response to selection of link 1625.

Figure 17:
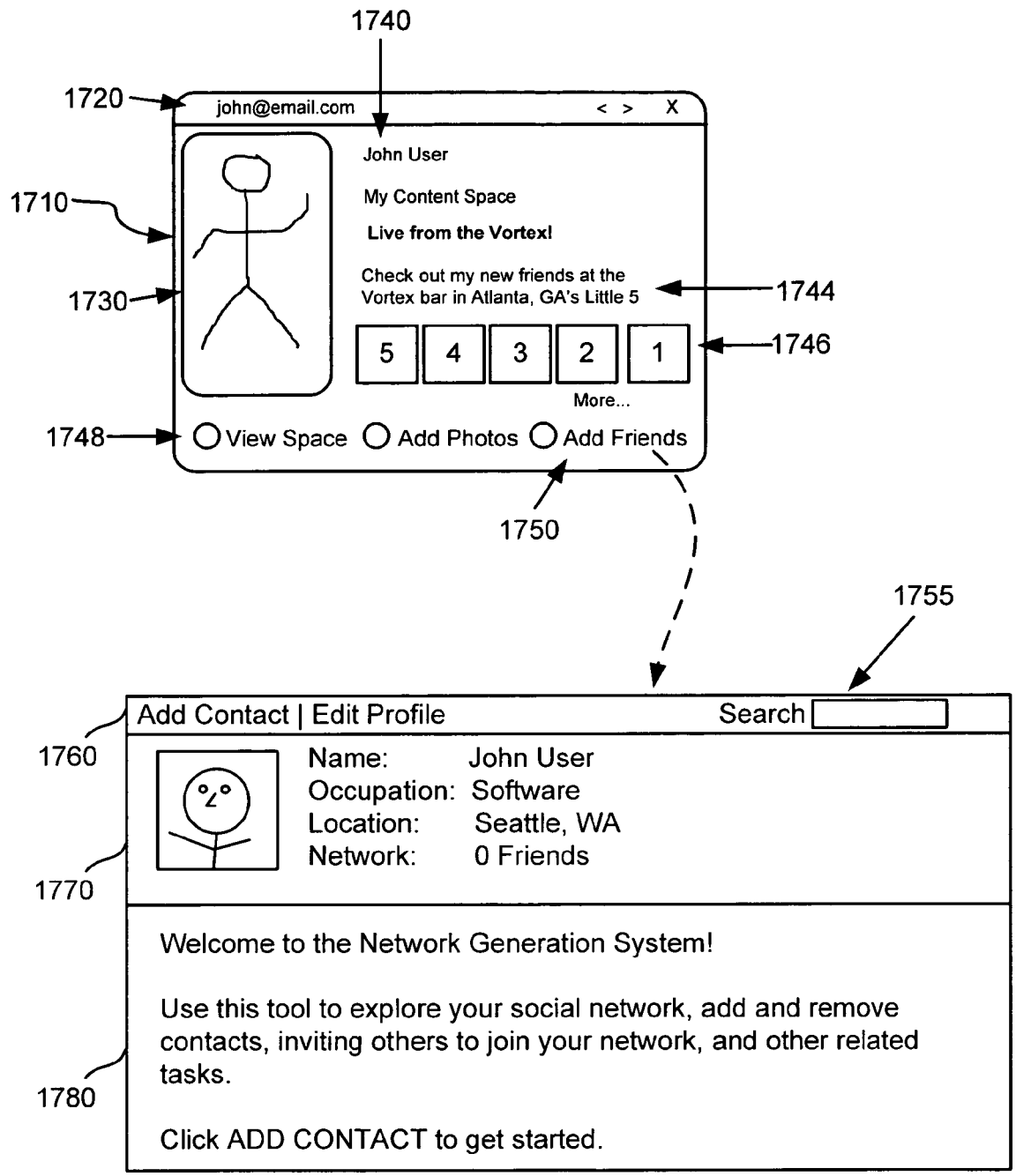
FIG. 17 illustrates an embodiment of a summary module interface and content page for accessing a contact network.

FIG. 17 illustrates an embodiment of a summary module 1710 for accessing a contact network interface. Summary module 1710 may summarize a content page configured by a user and provided through a content page management service. In one embodiment, a content page may be a web page customized by a user. The content page may be provided by a web service (for example, a content page management web service) that allows users to generate content pages and view other user's content pages. In this case, a use may configure a content page to include links, music lists, a blog, a photo and/or video collection, and other content. The summary module may be configured to provide a summary of the content page. For example, the summary module may provide the most recent entry of a blog, the first photograph or image of a photo album or video stream, one or more of a list of links, one or more songs of a music list, as well as user identification information. Further, the summary module may be configured to have a similar look-and-feel of a content page (for example, similar backgrounds, similar content categories, similar fonts and colors, etc.).

Summary module 1710 associated with a user's content page may be provided in response to selection by the user of an appropriate user icon or link from a instant messaging interface, email service interface, or content page interface. Summary module 1710 includes header window 1720, a contact image or thumbnail 1730 and a toolbar 1748. To the right of contact image 1730 is user information retrieved from a user content page. The user information may include the user name 1740, summary content 1744 and photos (or thumbnail images) 1746. Included in toolbar 1748 is an "add friends" link 1750. In response to selection of link 1750, summary module 1710 provides a contact network interface 1755. Contact network interface 1755 includes header window 1760, profile information window 1770 and contact list information window 1780. Similar to contact network interface 1665 of FIG. 16, contact network interface 1755 allows a user to add contacts to their contact network. Once a user provides input to add a contact, the contact network interface may add the contact as discussed above with respect to method 1400.

Figure 18:
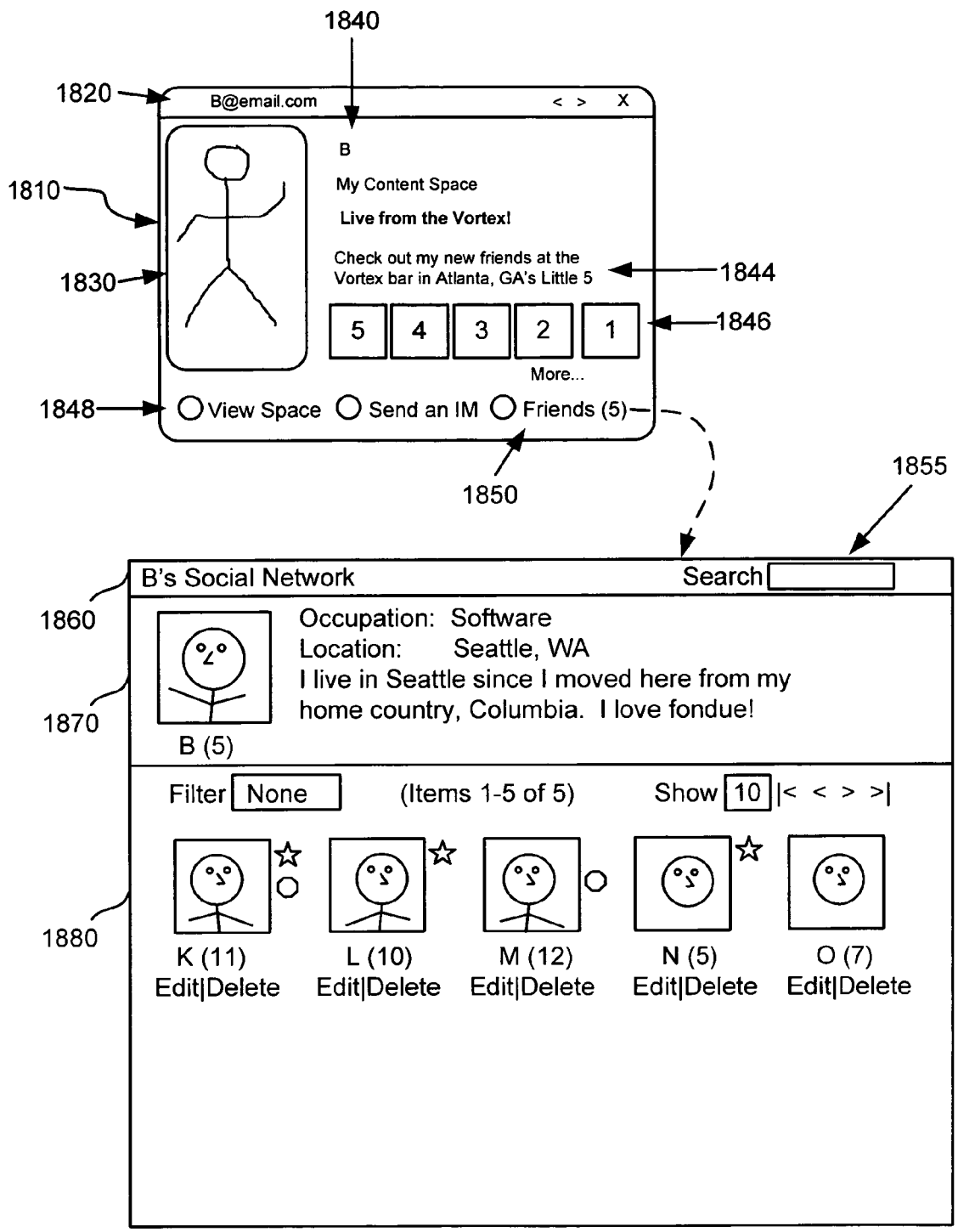
FIG. 18 illustrates an embodiment of a summary module interface and content page for accessing the contact's contact network.

FIG. 18 illustrates an embodiment of a contact's summary module 1810 for accessing a contact's contact network. Unlike summary module 1710 of FIG. 17, summary module 1810 is for a user's contact rather the user himself. Summary module 1810 associated with a contact's content page may be provided in response to selection by the user of an appropriate contact icon or link from a instant messaging interface, email service interface, or content page interface. Summary module 1830 includes the header window 1820, contact image 1830, toolbar 1848 and content 1744, all having to content associated with a user's contact. Within toolbar 1848 is a "friends" link 1850. As illustrated, upon selection of link 1850, a contact network interface 1855 is generated. Contact network interface 1855 is associated with the contact's contact list and includes header window 1860, profile information window 1870 and contact list information window 1880. Header window 1860 indicates that the contact network interface 1855 is that of a selected contact "B." Profile information window 1870 provides information regarding the selected contact such as the contact's occupation, location and other information. Contact list information window 1880 provides the contact list associated with the selected contact "B." In particular, five contacts are provided which comprise the selected contact's contact list.

Figure 19:
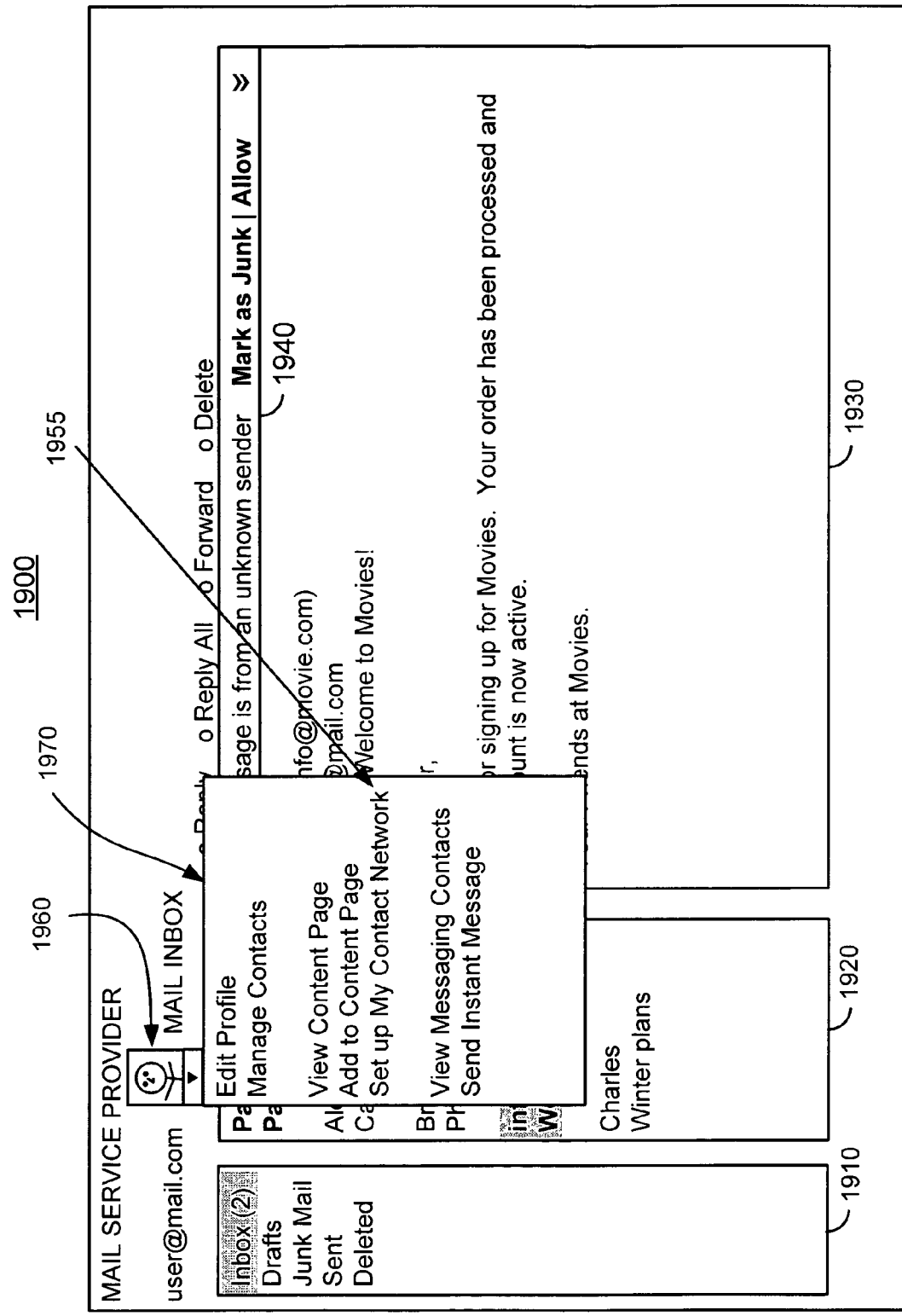
FIG. 19 illustrates an embodiment of an electronic mail service inbox interface for accessing a user's contact network.

FIG. 19 is an embodiment of an electronic mail service inbox interface 1900 for accessing a user's contact network. Interface 1900 may be provided by browser application or mail client application on a client computer, such as client 370 of FIG. 1. Interface 1900 includes a folder window 1910, an inbox window 1920, and a message window 1930. The folder window 1910 includes a list of folders for a user's mail account. The "inbox" folder is highlighted in folder window 1910. Inbox window 1920 illustrates a list of messages within the currently highlighted inbox folder. Message window 1930 provides content of a message currently selected in the inbox window 1920. Above the inbox window is a representative user icon 1960. Upon being selected, a drop-down menu 1970 is provided in interface 1900. Drop down menu 1970 may include one or more links. When a link is selected, the application providing interface 1900 initiates a particular action associated with the link. Among the links in drop down menu 1970 is a "set up my contact network" link 1975. Upon selecting link 1975, a contact network interface is provided to the user. In one embodiment, the contact network interface is similar to contact network interface 100 of FIG. 1 if the user has configured a contact list, or contact network interface 1665 of FIG. 16 if the user has not configured a contact list.

Figure 20:
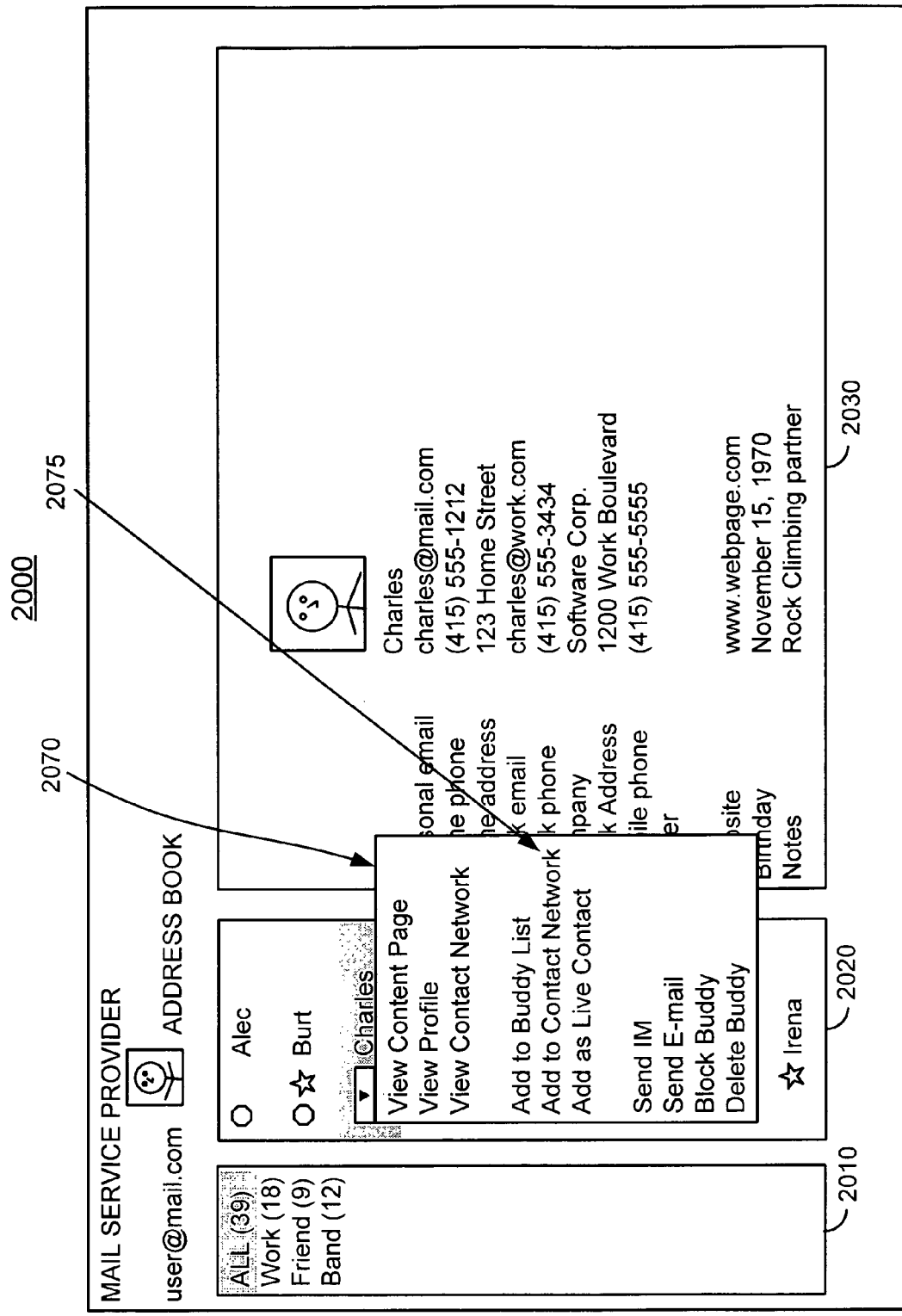
FIG. 20 illustrates an embodiment of an electronic mail service address book interface for accessing a contact's contact list.

In addition to accessing a contact network through an inbox interface, a user may also access a contact network through a user contacts or address book interface of an electronic mail service. FIG. 20 illustrates an embodiment of an electronic mail service user contact interface 2000 for accessing a contact's contact list. Interface 2000 includes contact folder window 2010, contact window 2020 and contact information window 2030. Contact folder window 2010 includes a list of contact groups within the user's contact list. Contact window 2020 illustrates contacts within the selected group "all" of contact folder window 2010. Contact information window 2030 provides more information for the selected contact within contact window 2020. Within contact window 2020, a contact "Charles" is currently highlighted. When selected, a drop-down menu 2070 is provided below the selected contact. Within drop-down menu 2070 is a "add to contact network" link 2075. In response to receiving input that selects link 2075, the application providing the link may provide an interface which allows the selecting user to add Charles to the user's contact list. In particular, a contact network interface may be provided to a user in response to user selection of link 2075. The contact network interface may be similar to contact network interface 100 of FIG. 1 if the user has configured a contact list, or similar to contact network interface 1665 of FIG. 16 if the user has not configured a contact list.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A computer implemented method for providing contact information to a user, comprising:

providing an electronic mail service interface to the user over a network, the electronic mail service interface allowing the user, having an account with an electronic mail service, to send and receive electronic mail to and from a second user having an account with a different electronic mail service;

receiving a first user input via the electronic mail service interface to view a first contact list, the first contact list containing the user's contacts;

outputting the first contact list for display in response to the first user input, the first contact list including a first contact;

receiving a second user input indicating that the user has selected the first contact displayed in the first contact list;

outputting a second contact list for display in response to the second user input received from the user, the second contact list displaying contacts associated with the first contact selected by the user, the second contact list is different than the first contact list, wherein the outputting the second contact list includes outputting profile information for each contact in the second contact list, the profile information includes an email address associated with each contact, and wherein outputting the second contact list comprises:

determining if an instant messaging application is running, starting the instant messaging application if the instant messaging application is not running, sending a request to the instant messaging application for an indication of whether the contacts associated with the first contact selected by the user are online, receiving a response from the instant messaging application indicating whether the contacts associated with the first contact selected by the user are online, and displaying in the second contact list whether the contacts associated with the first contact selected by the user are online in response to the instant messaging application;

receiving a third user input indicating that the user has selected a contact displayed in the second contact list; and adding the contact the user selected from the second contact list to the first contact list thereby associating the contact the user selected from the second contact list with the user without first requiring approval from the contact selected in the second contact list.

2. The computer implemented method of claim 1, wherein said step of outputting the second contact list includes:

outputting executable computer code to a browser application at a client, the executable computer code, when executed, causes the browser application to access the second contact list.

3. The computer implemented method of claim 1, wherein said step of outputting the second contact list includes:

outputting computer code to a mail client application at a client, the computer code, when executed, causes the mail client application to open a browser application on the client and causes the browser application to access the second contact list.

4. The computer implemented method of claim 1, wherein said step of outputting the second contact list includes:
  determining whether each contact in the second contact list has updated a content page associated with the contact, the content page provided through a content page management system.

5. The method of claim 1, wherein the step of adding the contact the user selected from the second contact list to the first contact list further includes steps of:
  determining if a third contact list for the contact the user selected from the second contact list includes the user; and
  if the third contact list for the contact the user selected from the second contact list includes the user, then promoting the user to a two-way relationship in the contact list for the contact the user selected from the second contact list and adding the contact the user selected from the second contact list to the first contact list as a two-way relationship.

6. One or more processor readable computer storage devices having processor readable code embodied on said processor readable storage devices, said processor readable code for programming one or more processors to perform a method comprising:
  (a) providing an electronic mail service interface to a user associated with a first contact list, the electronic mail service interface allowing the user to send and receive electronic mail to and from a different user having an account with a different electronic mail service;
  (b) receiving a first user input via the electronic mail service interface to view the first contact list, the first contact list containing the user's contacts;
  (c) displaying the first contact list as a current contact list in the electronic mail service interface provided to the user;
  (d) receiving another user input indicating that the user has selected a contact displayed in the current contact list;
  (e) displaying a new contact list as the current contact list in response to the another user input received from the user, the new contact list displaying contacts associated with the contact selected by the user that was received in an immediately previous iteration of step (d), the new contact list is different than an immediately previous current contact list, wherein displaying the new contact list comprises:
    determining if an instant messaging application is running,
    starting the instant messaging application if the instant messaging application is not running,
    sending a request to the instant messaging application for an indication of whether the contacts associated with the contact selected by the user are online,
    receiving a response from the instant messaging application indicating whether the contacts associated with the contact selected by the user are online, and
    displaying in the new contact list whether the contacts associated with the contact selected by the user are online in response to the instant messaging application;
  (f) repeating steps (d) and (e) for N layers of contacts until a final contact is selected; and
  (g) adding the final contact to the first contact list thereby associating the final contact with the user without first requiring approval from the final contact.

7. The one or more processor readable storage computer devices according to claim 6, wherein:
  the first user input and the another user input are received through an interface provided within a web browser.

8. A computer implemented method for providing contact information to a user, comprising:
  providing an electronic mail service interface to the user, the electronic mail service interface allowing the user, having an account with an electronic mail service, to send and receive electronic mail to and from a second user having an account with a different electronic mail service;
  receiving a first user input via the electronic mail service interface to view a first contact list, the first contact list containing the user's contacts;
  outputting the first contact list for display in response to the first user input, the first contact list including a first contact;
  receiving a second user input indicating that the user has selected the first contact displayed in the first contact list;
  outputting a second contact list for display in response to the second user input, the second contact list displays contacts associated with the first contact selected by the user, the second contact list is different than the first contact list, the outputting the of the second contact list includes:
    determining if an instant messaging application is running,
    starting the instant messaging application if the instant messaging application is not running,
    sending a request to the instant messaging application for an indication of whether the contacts associated with the first contact selected by the user are online,
    receiving a response from the instant messaging application indicating whether the contacts associated with the first contact selected by the user are online, and
    displaying whether the contacts associated with the first contact selected by the user are online in response to the instant messaging application;
  receiving a third user input indicating that the user has selected a contact displayed in the second contact list; and
  adding the contact the user selected from the second contact list to the first contact list without first requiring approval from the contact selected in the second contact list.

9. The computer implemented method of claim 8, wherein said step of outputting the second contact list includes:
  outputting executable computer code to a browser application at a client, the executable computer code, when executed, causes the browser application to access the second contact list.

10. The computer implemented method of claim 8, wherein said step of outputting the second contact list includes:
  outputting computer code to a mail client application at a client, the computer code, when executed, causes the mail client application to open a browser application on the client and causes the browser application to access the second contact list.

11. The computer implemented method of claim 8, further comprising:
  (a) receiving additional user input indicating that the user has selected an additional contact;
  (b) displaying a new contact list;
  (c) repeating steps (a) and (b) for multiple levels of contacts.

* * * * *